US012628005B2

(12) United States Patent
Go et al.

(10) Patent No.: US 12,628,005 B2
(45) Date of Patent: May 12, 2026

(54) METHOD AND APPARATUS FOR TRANSMITTING AND RECEIVING SIGNAL IN WIRELESS COMMUNICATION SYSTEM

(71) Applicant: LG ELECTRONICS INC., Seoul (KR)

(72) Inventors: Seongwon Go, Seoul (KR); Jiwon Kang, Seoul (KR); Kyuseok Kim, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 647 days.

(21) Appl. No.: 18/010,980

(22) PCT Filed: Jun. 21, 2021

(86) PCT No.: PCT/KR2021/007727
§ 371 (c)(1),
(2) Date: Dec. 16, 2022

(87) PCT Pub. No.: WO2021/261853
PCT Pub. Date: Dec. 30, 2021

(65) Prior Publication Data
US 2023/0284045 A1     Sep. 7, 2023

(30) Foreign Application Priority Data
Jun. 22, 2020     (KR) ........................ 10-2020-0076036

(51) Int. Cl.
H04W 24/02          (2009.01)
H04W 16/28          (2009.01)

(52) U.S. Cl.
CPC ........... H04W 24/02 (2013.01); H04W 16/28 (2013.01)

(58) Field of Classification Search
CPC ..... H04B 7/06952; H04B 17/309; H04L 5/00; H04W 16/28; H04W 24/02; H04W 8/24; H04W 36/0055; H04W 28/20
See application file for complete search history.

(56) References Cited

U.S. PATENT DOCUMENTS

2019/0104500 A1 *   4/2019   Reial ................... G06F 9/45558
2020/0100232 A1     3/2020   Onggosanusi et al.
(Continued)

FOREIGN PATENT DOCUMENTS

CN          115669096      *   6/2020   ......... H04B 7/06968

OTHER PUBLICATIONS

International Search Report from PCT/KR2021/007727, dated Oct. 14, 2021.
(Continued)

Primary Examiner — Sulaiman Nooristany
(74) Attorney, Agent, or Firm — BRYAN CAVE LEIGHTON PAISNER LLP

(57)          ABSTRACT
A method and an apparatus for transmitting/receiving a signal in a wireless communication system are disclosed. A method for receiving a downlink signal according to one embodiment of the present disclosure, may comprise steps of: receiving, from a base station, configuration information related to transmission parameters for a plurality of signals; receiving, from the base station, an update message for updating a transmission parameter for a specific downlink signal; and receiving the downlink signal based on the updated transmission parameter. Transmission parameters for one or more signals including the specific downlink signal among the plurality of signals may be all identically updated by the update message.

11 Claims, 28 Drawing Sheets

(56)     References Cited

U.S. PATENT DOCUMENTS

| | | | | |
|---|---|---|---|---|
| 2020/0153579 | A1* | 5/2020 | Charbit | ................. H04W 72/23 |
| 2023/0155753 | A1* | 5/2023 | Zhou | .................... H04L 5/0092 |
| | | | | 370/329 |

OTHER PUBLICATIONS

Vivo, Remaining issues on multi-beam transmission, R1-1912040, 3GPP TSG RAN WG1 #99, Reno, USA, Nov. 8, 2019, see section 2.
Nokia, et al., Enhancements on Multi-beam operation, R1-1909210, 3GPP TSG RAN WG1 #98, Prague, Czech Republic, Aug. 16, 2019, see section 2.3.
Sony, Remaining issues on multi-beam operation, R1-2004186, 3GPP TSG RAN WG1 #101-e, May 16, 2020, see sections 2.1-2.2.
Huwei et al., Remaining issues on multi-beam enhancements in R16, R1-2001564, 3GPP TSG RAN WG1 #100bis-e, E-meeting, Apr. 11, 2020, see sections 2.4-2.6.

* cited by examiner

TERMINAL                                    BASE STATION

S610

NZP CSI-RS resource set IE

Receiving CSI-RS resource(s) configured    S620
with Repetition 'ON' through same Tx beam S630 — Determine Rx beam

S640

Omit CSI report (No report)

Base station Rx beam sweeping

Terminal Tx beam (fixed)

(a)

Base station Rx beam fixed

Terminal Tx beam sweeping (b)

| A/D | | Serving Cell ID | | | BWP ID | | Oct 1 |
| R | IM | SP CSI-RS resource set ID | | | | | Oct 2 |
| R | R | SP CSI-IM resource set ID | | | | | Oct 3 |
| R | | TCI State $ID_0$ | | | | | Oct 4 |

. . .

| R | TCI State $ID_N$ | Oct N+4 |

| CORE SET Pool ID | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

. . .

| $T_{(N-2) \times 8+7}$ | $T_{(N-2) \times 8+6}$ | $T_{(N-2) \times 8+5}$ | $T_{(N-2) \times 8+4}$ | $T_{(N-2) \times 8+3}$ | $T_{(N-2) \times 8+2}$ | $T_{(N-2) \times 8+1}$ | $T_{(N-2) \times 8}$ | Oct N |
|---|---|---|---|---|---|---|---|---|

| A/D | SRS Resource Set's Cell ID | SRS Resource Set' BWP ID | Oct 1 |
|---|---|---|---|

| R | R | C | SUL | SP SRS Resource Set ID | Oct 2 |

| $F_0$ | Resource $ID_0$ | Oct 3 |

. . .

| $F_{M-1}$ | Resource $ID_{M-1}$ | Oct N-M |

| R | Resource Serving Cell $ID_0$ | Resource BWP $ID_0$ | Oct N-M+1 |

. . .

| R | Resource Serving Cell $ID_{M-1}$ | Resource BWP $ID_{M-1}$ | Oct N |

FIG.21

| R | Serving Cell ID | | | | BWP ID | | Oct 1 |
|---|---|---|---|---|---|---|---|
| R | PUCCH Resource ID | | | | | | Oct 2 |
| $S_7$ | $S_6$ | $S_5$ | $S_4$ | $S_3$ | $S_2$ | $S_1$ | $S_0$ |

Oct 3

FIG.22

| | | | |
|---|---|---|---|
| R | Serving Cell ID | BWP ID | Oct 1 |
| R | PUCCH Resource ID | | Oct 2 |
| R | R | Spatial Relation Info ID | Oct 3 |

. . .

| | | |
|---|---|---|
| R | PUCCH Resource ID | Oct 2N-2 |
| R | R | Spatial Relation Info ID | Oct 2N-1 |

RECEIVE TRANSMISSION PARAMETER RELATED
CONFIGURATION INFORMATION FOR A PLURALITY OF SIGNALS ～S2401

RECEIVE TRANSMISSION PARAMETER UPDATE
MESSAGE FOR A SPECIFIC DOWNLINK SIGNAL ～S2402

RECEIVE THE SPECIFIC DOWNLINK SIGNAL
BASED ON UPDATED TRANSMISSION PARAMETER ～S2403

TRANSMIT TRANSMISSION PARAMETER RELATED
CONFIGURATION INFORMATION FOR A PLURALITY OF SIGNALS ~ S2501

TRANSMIT TRANSMISSION PARAMETER UPDATE
MESSAGE FOR A SPECIFIC DOWNLINK SIGNAL ~ S2502

TRANSMIT THE SPECIFIC DOWNLINK SIGNAL
BASED ON UPDATED TRANSMISSION PARAMETER ~ S2503

METHOD AND APPARATUS FOR TRANSMITTING AND RECEIVING SIGNAL IN WIRELESS COMMUNICATION SYSTEM

TECHNICAL FIELD

The present disclosure relates to a wireless communication system, and in more detail, relates to a method and an apparatus of transmitting and receiving an uplink signal and/or a downlink signal in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for transmitting and receiving an uplink signal and/or a downlink signal.

In addition, an additional technical object of the present disclosure is to provide a method and an apparatus for updating a transmission parameter of an uplink signal and/or a downlink signal (e.g., a transmission/reception beam of a terminal, a transmission configuration indication state, spatial relation info, a quasi co-locate (QCL) type D reference signal, etc.).

The technical objects to be achieved by the present disclosure are not limited to the above-described technical objects, and other technical objects which are not described herein will be clearly understood by those skilled in the pertinent art from the following description.

A method for receiving a downlink signal in a wireless communication system according to an aspect of the present disclosure may comprise: receiving, from a base station, configuration information related to transmission parameters for a plurality of signals; receiving, from the base station, an update message for updating a transmission parameter for a specific downlink signal; and receiving the downlink signal based on the updated transmission parameter. Transmission parameters for one or more signals including the specific downlink signal among the plurality of signals may be all identically updated by the update message.

A method for transmitting a downlink signal in a wireless communication system according to an additional aspect of the present disclosure may comprise: transmitting, to a terminal, configuration information related to transmission parameters for a plurality of signals; transmitting, to the terminal, an update message for updating a transmission parameter for a specific downlink signal; and transmitting the downlink signal based on the updated transmission parameter. Transmission parameters for one or more signals including the specific downlink signal among the plurality of signals may be all identically updated by the update message.

A method for transmitting an uplink signal in a wireless communication system according to an additional aspect of the present disclosure may comprise: receiving, from a base station, configuration information related to transmission parameters for a plurality of signals; receiving, from the base station, an update message for updating a transmission parameter for a specific uplink signal; and transmitting the uplink signal based on the updated transmission parameter. Transmission parameters for one or more signals including the specific uplink signal among the plurality of signals may be all identically updated by the update message.

A method for receiving an uplink signal in a wireless communication system according to an additional aspect of the present disclosure may comprise: transmitting, to a terminal, configuration information related to transmission parameters for a plurality of signals; transmitting, to the terminal, an update message for updating a transmission parameter for a specific uplink signal; and receiving the uplink signal based on the updated transmission parameter. Transmission parameters for one or more signals including the specific uplink signal among the plurality of signals may be all identically updated by the update message.

According to an embodiment of the present disclosure, by updating transmission parameters for multiple signals (uplink channel/reference signal and/or downlink channel/reference signal) only with an update instruction for a single transmission parameter (e.g., transmission/reception beam of a terminal, transmission configuration indication state, spatial relation info, quasi co-locate (QCL) Type D reference signal, etc.), signaling overhead and delay may be reduced.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

FIG. 16 is a diagram illustrating semi-persistent CSI-RS/CSI-IM resource set activation/deactivation MAC CE according to an embodiment of the present disclosure.

FIG. 17 is a diagram illustrating TCI state activation/deactivation MAC CE for a UE-specific PDSCH according to an embodiment of the present disclosure.

FIG. 19 illustrates semi-persistent SRS activation/deactivation MAC CE according to an embodiment of the present disclosure.

FIG. 21 is a diagram illustrating a PUCCH spatial relation active/inactive MAC CE in a wireless communication system to which the present disclosure may be applied.

FIG. 22 is a diagram illustrating an enhanced PUCCH spatial relation active/inactive MAC CE in a wireless communication system to which the present disclosure may be applied.

DETAILED DESCRIPTION

Figure 1:
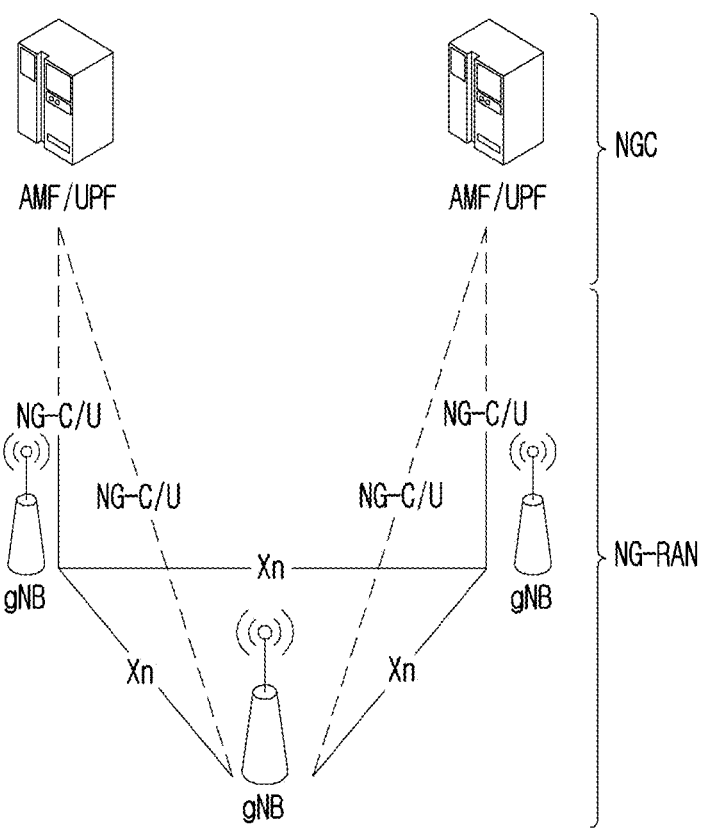
FIG. 1 illustrates a structure of a wireless communication system to which the present disclosure may be applied.

Hereinafter, embodiments according to the present disclosure will be described in detail to by referring accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
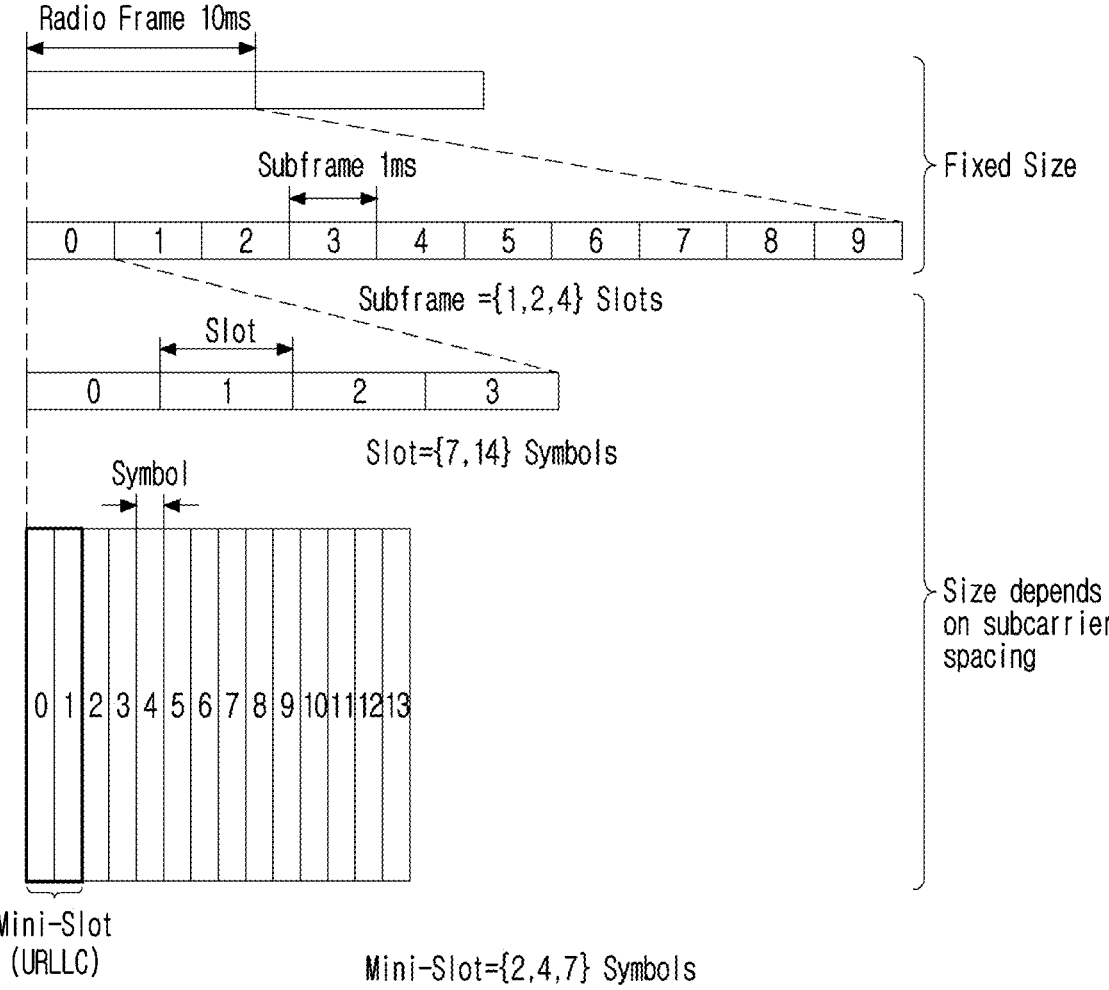
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c = 1/(\Delta f_{max} \cdot N_f)$. Here, $\Delta f_{max}$ is 480.103 Hz and $N_f$ is 4096. Downlink and uplink transmission is configured (organized) with a radio frame having a duration of $T_f = 1/(\Delta f_{max} N_f/100)$. $T_c = 10$ ms. Here, a radio frame is configured with 10 subframes having a duration of $T_{sf} = (\Delta f_{max} N_f/1000)$. $T_c = 1$ ms, respectively. In this case, there may be one set of frames for an uplink and one set of frames for a downlink. In addition, transmission in an uplink frame No. i from a terminal should start earlier by $T_{TA} = (N_{TA} + N_{TA, offset}) T_c$ than a corresponding downlink frame in a corresponding terminal starts. For a subcarrier spacing configuration μ, slots are numbered in an increasing order of $n_s^{\mu} \in \{0, \ldots, N_{slot}^{subframe,\mu} - 1\}$ in a subframe and are numbered in an increasing order of $n_{s,f}^{\mu} \in \{0, \ldots, N_{slot}^{frame,\mu} - 1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu} N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,u}$ | $N_{slot}^{subframe,u}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,u}$ | $N_{slot}^{subframe,u}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1, 2, 4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
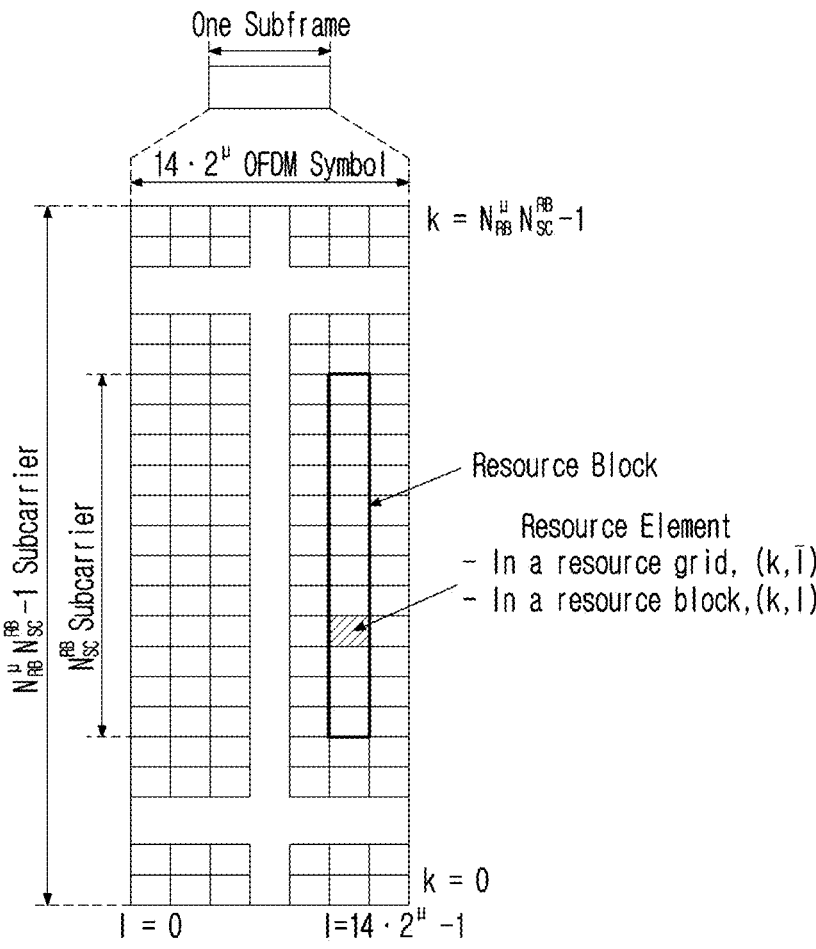
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu}N_{sc}^{RB}$ subcarriers in a frequency domain and one subframe is configured with $14.2^{\mu}$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k, l'). Here, k=0, . . . , $N_{RB}^{\mu}N_{sc}^{RB}-1$ is an index in a frequency domain and l'=0, . . . , $2^{\mu}N_{symb}^{(\mu)}-1$ refers to a position of a symbol in a subframe. When referring to a resource element in a slot, an index pair (k, l) is used. Here, l=0, . . . , $N_{symb}^{\mu}-1$. A resource element (k, l') for μ and an antenna port p corresponds to a complex value, $a_{k,l'}^{(p, \mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration u is identical to 'point A'. A relationship between a common resource block number $n_{CRB}^{\mu}$ and a resource element (k, l) for a subcarrier spacing configuration u in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{\mu}$ is a common resource block that a BWP starts relatively to common resource block 0.

Figure 4:
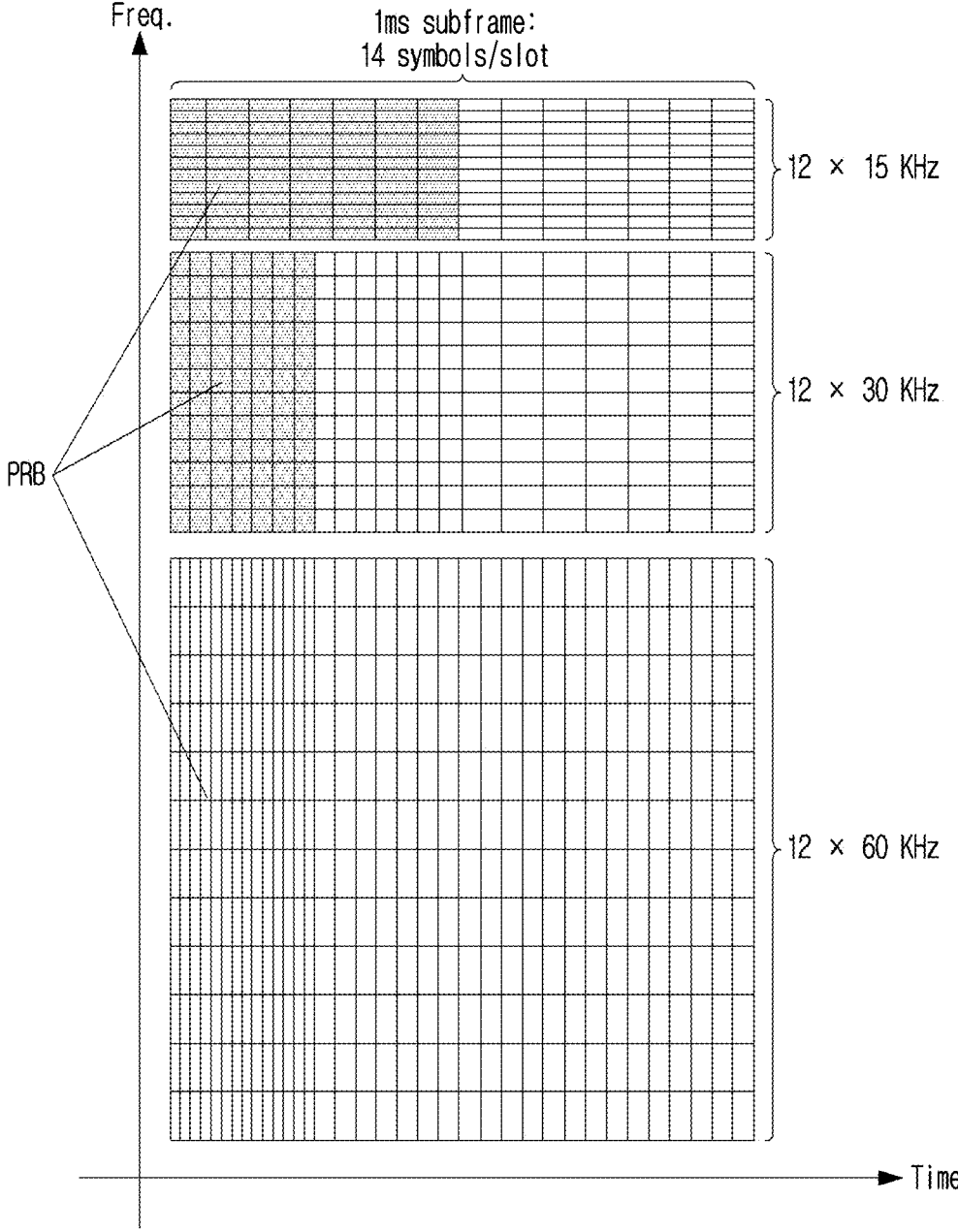
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
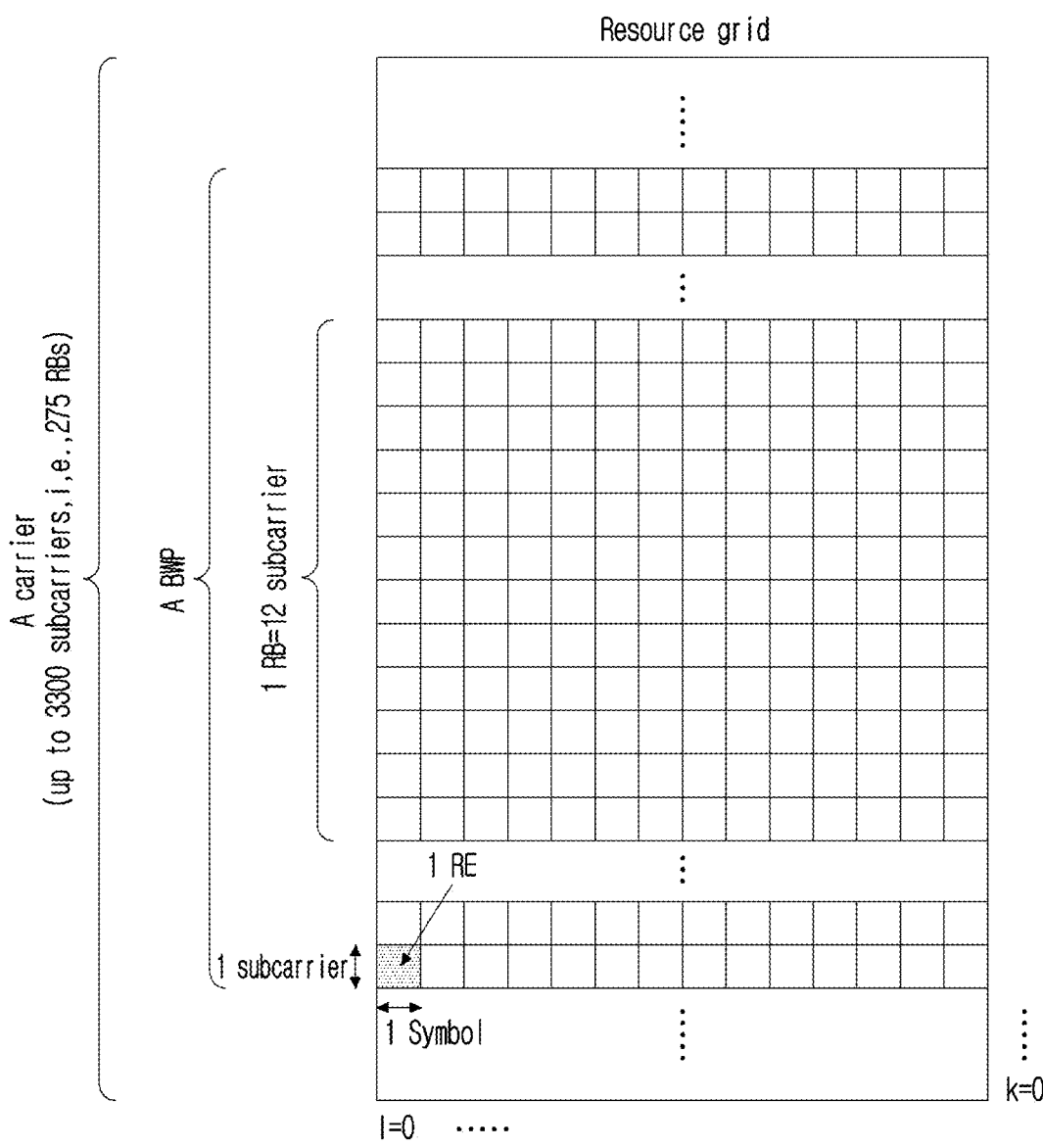
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
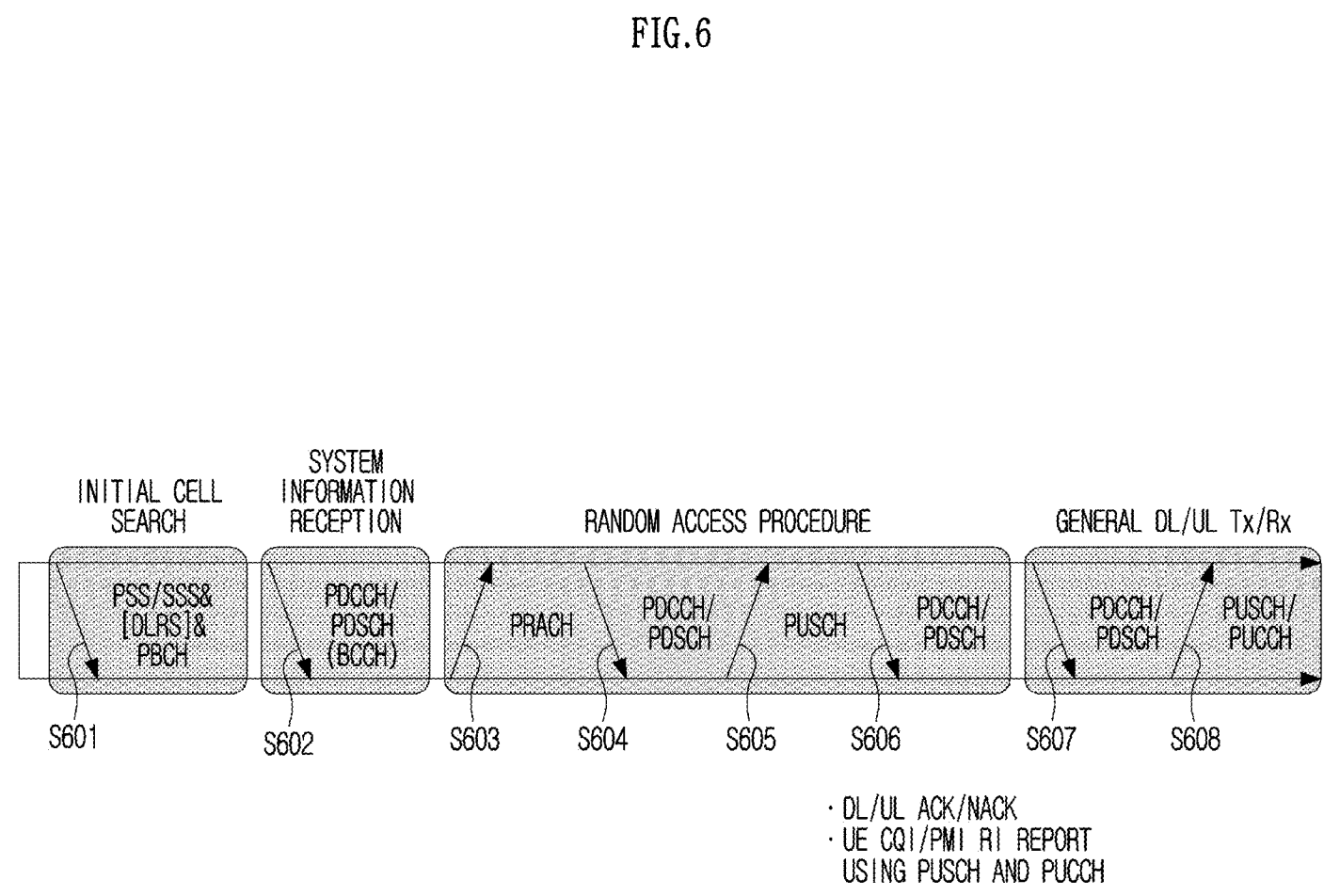

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-Co Locaton (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Beam Management (BM)

A BM procedure is L1 (layer 1)/L2 (layer 2) procedures to obtain and maintain a set of beams of a base station (e.g., a gNB, a TRP, etc.) and/or terminal (e.g., a UE) beams which may be used for downlink (DL) and uplink (UL) transmission/reception, it may include the following procedures and terms.

Beam measurement: An operation that a base station or a UE measures a property of a received beamformed signal Beam determination: An operation that a base station or a UE selects its Tx beam/Rx beam Beam sweeping: An operation that a spatial region is covered by using a Tx and/or Rx beam for a certain time interval in a pre-determined method Beam report: An operation that a UE reports information of a beamformed signal based on beam measurement A BM procedure may be classified into (1) a DL BM procedure using a SS (synchronization signal)/PBCH (physical broadcast channel) Block or a CSI-RS and (2) an UL BM procedure using an SRS (sounding reference signal).

In addition, each BM procedure may include Tx beam sweeping for determining a Tx Beam and Rx beam sweeping for determining a Rx beam.

Hereinafter, a DL BM procedure will be described.

A DL BM procedure may include (1) transmission of beamformed DL RSs (reference signals) of a base station (e.g., a CSI-RS or a SS Block (SSB)) and (2) beam reporting of a terminal.

Here, beam reporting may include preferred DL RS ID (identifier) (s) and corresponding L1-RSRP (Reference Signal Received Power).

The DL RS ID may be a SSBRI (SSB Resource Indicator) or a CRI (CSI-RS Resource Indicator).

Hereinafter, a DL BM procedure using an SSB will be described.

Figure 7:
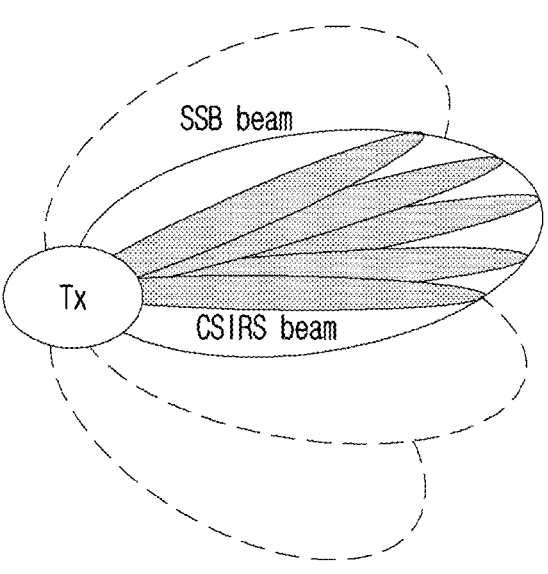
FIG. 7 is a diagram which illustrates a downlink beam management operation in a wireless communication system to which the present disclosure may be applied.

FIG. 7 is a diagram which illustrates a downlink beam management operation in a wireless communication system to which the present disclosure may be applied.

In reference to FIG. 7, an SSB beam and a CSI-RS beam may be used for beam measurement. A measurement metric is L1-RSRP per resource/block. An SSB may be used for coarse beam measurement and a CSI-RS may be used for fine beam measurement. An SSB may be used for both of Tx beam sweeping and Rx beam sweeping.

Rx beam sweeping using an SSB may be performed while an UE changes an Rx beam for the same SSBRI across a plurality of SSB bursts. In this case, one SS burst includes one or more SSBs and one SS burst set includes one or more SSB bursts.

Figure 8:
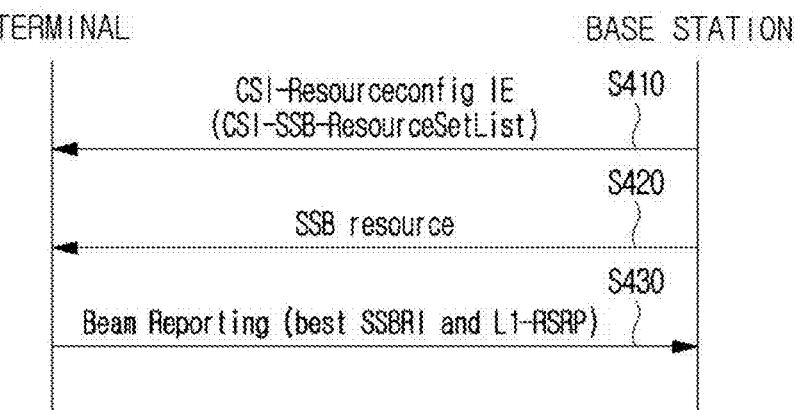
FIG. 8 is a diagram which illustrates a downlink beam management procedure using SSB in a wireless communication system to which the present disclosure may be applied.

FIG. 8 is a diagram which illustrates a downlink beam management procedure using SSB in a wireless communication system to which the present disclosure may be applied.

A configuration on a beam report using an SSB is performed in a CSI/beam configuration in a RRC connected state (or a RRC connected mode).

In reference to FIG. 8, a terminal receives CSI-ResourceConfig IE including CSI-SSB-ResourceSetList including SSB resources used for BM from a base station (S410).

Table 6 represents an example of CSI-ResourceConfig 1E and as in Table 6, a BM configuration using an SSB configures an SSB like a CSI-RS resource without being separately defined.

TABLE 6

ASN1START
TAG-CSI-RESOURCECONFIG-START

TABLE 6-continued

```
CSI-ResourceConfig : :=          SEQUENCE {
csi-ResourceConfigId             CSI-ResourceConfigId,
csi-RS-ResourceSetList             CHOICE {
nzp-CSI-RS-SSB                   SEQUENCE {
nzp-CSI-RS-ResourceSetList         SEQUENCE (SIZE (1..maxNrofNZP-CSI-RS-
ResourceSetsPerConfig) ) OF NZP-CSI-RS-ResourceSetId OPTIONAL,
csi-SSB-ResourceSetList            SEQUENCE (SIZE (1..maxNrofCSI-SSB-
ResourceSetsPerConfig) ) OF CSI-SSB-ResourceSetId     OPTIONAL
},
csi-IM-ResourceSetList           SEQUENCE (SIZE (1..maxNrofCSI-IM-
ResourceSetsPerConfig) ) OF CSI-IM-ResourceSetId
},
bwp-Id                           BWP-Id,
resourceType                     ENUMERATED { aperiodic, semiPersistent,
periodic },
. . .
}
TAG-CSI-RESOURCECONFIGTOADDMOD-STOP
-- ASN1STOP
```

In Table 6, a csi-SSB-ResourceSetList parameter represents a list of SSB resources used for beam management and reporting in one resource set. Here, an SSB resource set may be configured as {SSBx1, SSBx2, SSBx3, SSBx4, . . . }. An SSB index may be defined from 0 to 63. A terminal receives an SSB resource from the base station based on the CSI-SSB-ResourceSetList (S420).

When CSI-RS reportConfig related to a report on a SSBRI and L1-RSRP is configured, the terminal performs (beam) reporting of the best SSBRI and corresponding L1-RSRP to a base station (S430).

Hereinafter, a DL BM procedure using a CSI-RS will be described.

Describing a usage of a CSI-RS, i) a repetition parameter is configured for a specific CSI-RS resource set and when TRS_info is not configured, a CSI-RS is used for beam management. ii) when a repetition parameter is not configured and TRS_info is configured, a CSI-RS is used for a TRS (tracking reference signal). iii) when a repetition parameter is not configured and TRS_info is not configured, a CSI-RS is used for CSI acquisition.

Such a repetition parameter may be configured only for CSI-RS resource sets associated with CSI-ReportConfig having a report of L1 RSRP or 'No Report (or None)'.

If a terminal is configured with CSI-ReportConfig in which reportQuantity is configured as 'cri-RSRP' or 'none' and CSI-ResourceConfig for channel measurement (a higher layer parameter resourcesForChannelMeasurement) does not include a higher layer parameter 'trs-Info' and includes NZP-CSI-RS-ResourceSet in which a higher layer parameter 'repetition' is configured, the terminal may be configured only with a same number of port (1-port or 2-port) having a higher layer parameter 'nrofPorts' for all CSI-RS resources in NZP-CSI-RS-ResourceSet.

When (a higher layer parameter) repetition is configured as 'ON', it is related to a Rx beam sweeping procedure of a terminal. In this case, when a terminal is configured with NZP-CSI-RS-ResourceSet, the terminal may assume that at least one CSI-RS resource in NZP-CSI-RS-ResourceSet is transmitted with the same downlink spatial domain transmission filter. In other words, at least one CSI-RS S resource in NZP-CSI-RS-ResourceSet is transmitted through the same Tx beam. Here, at least one CSI-RS resource in NZP-CSI-RS-ResourceSet may be transmitted in a different OFDM symbol. In addition, a terminal does not expect to receive a different periodicity in periodicityAndOffset in all CSI-RS resources in NZP-CSI-RS-Resourceset.

Meanwhile, when repetition is configured as 'OFF', it is related to a Tx beam sweeping procedure of a base station. In this case, when repetition is configured as 'OFF', a terminal does not assume that at least one CSI-RS resource in NZP-CSI-RS-ResourceSet is transmitted in the same downlink spatial domain transmission filter. In other words, at least one CSI-RS resource in NZP-CSI-RS-ResourceSet is transmitted through a different Tx beam.

In other words, when reportQuantity of the CSI-RS reportConfig IE is configured as 'ssb-Index-RSRP', a terminal reports the best SSBRI and corresponding L1-RSRP to a base station.

In addition, when a CSI-RS resource may be configured in the same OFDM symbol(s) as an SSB (SS/PBCH Block) and 'QCL-TypeD' is applicable, the terminal may assume that a CSI-RS and an SSB are quasi co-located with regard to 'QCL-TypeD'.

Here, the QCL TypeD may mean that antenna ports are quasi-colocated with regard to a spatial Rx parameter. When a terminal receives a plurality of DL antenna ports in a QCL Type D relationship, it is allowed to apply the same Rx beam. In addition, a terminal does not expect that a CSI-RS will be configured in a RE overlapped with a RE of an SSB.

Figure 9:
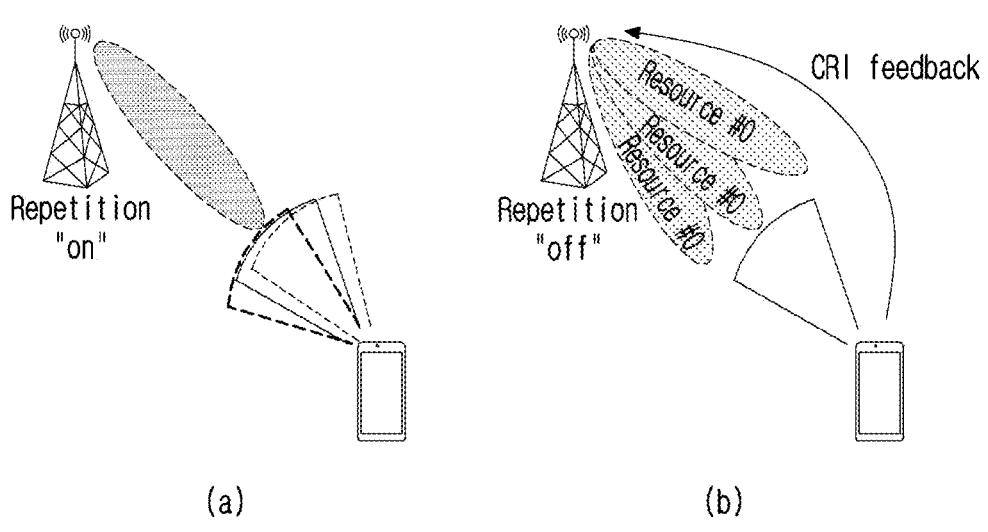
FIG. 9 is a diagram which illustrates a downlink beam management operation using CSI-RS in a wireless communication system to which the present disclosure may be applied.

FIG. 9 is a diagram which illustrates a downlink beam management operation using CSI-RS in a wireless communication system to which the present disclosure may be applied.

FIG. 9(a) represents a Rx beam determination (or refinement) procedure of a terminal and FIG. 9(b) represents a Tx beam sweeping procedure of a base station. In addition, FIG. 9(a) is a case when a repetition parameter is configured as 'ON' and FIG. 9(b) is a case when a repetition parameter is configured as 'OFF'.

Figure 10:
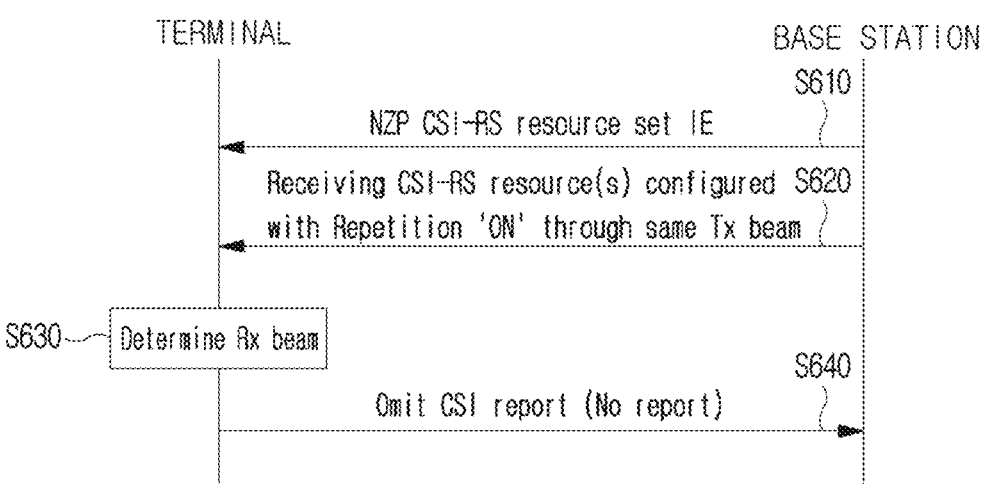
FIG. 10 is a diagram which illustrates an Rx beam determination process of a terminal in a wireless communication system to which the present disclosure may be applied.

FIG. 10 is a diagram which illustrates an Rx beam determination process of a terminal in a wireless communication system to which the present disclosure may be applied.

In reference to FIG. 9(a) and FIG. 10, an Rx beam determination process of a terminal is described.

A terminal receives NZP CSI-RS resource set IE including a higher layer parameter repetition through RRC signaling from a base station (S610). Here, the repetition parameter is configured as 'ON'.

A terminal repetitively receives resources in a CSI-RS resource set configured as repetition 'ON' through the same Tx beam (or DL spatial domain transmission filter) of a base station in a different OFDM symbol (S620).

A terminal determines its Rx beam (S630).

A terminal omits a CSI report (S640). In this case, reportQuantity of a CSI report configuration may be configured as 'No report (or None)'.

In other words, the terminal may omit a CSI report when it is configured as repetition 'ON'.

Figure 11:
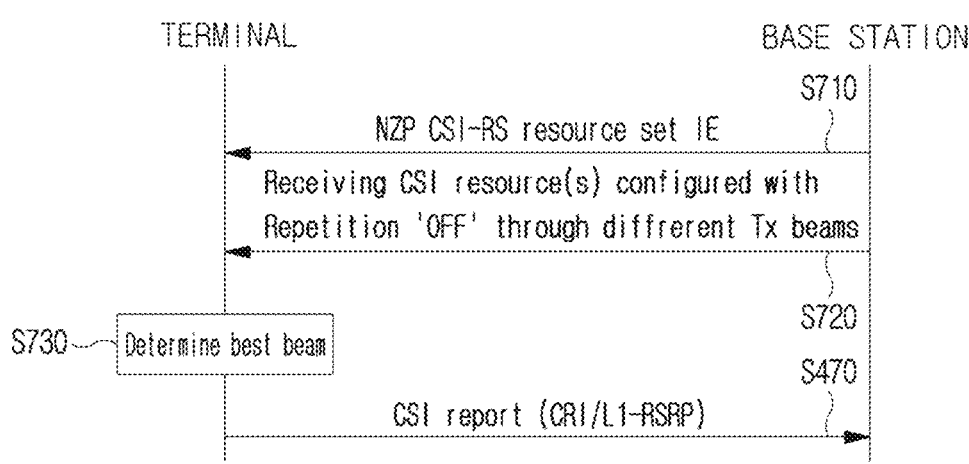
FIG. 11 is a diagram which illustrates a Tx beam determination process of a base station in a wireless communication system to which the present disclosure may be applied.

FIG. 11 is a diagram which illustrates a Tx beam determination process of a base station in a wireless communication system to which the present disclosure may be applied.

In reference to FIG. 9(b) and FIG. 11, a Tx beam determination process of a base station is described.

A terminal receives NZP CSI-RS resource set IE including a higher layer parameter repetition through RRC signaling from a base station (S710). Here, the repetition parameter is configured as 'OFF' and it is related to a Tx beam sweeping procedure of a base station.

A terminal receives resources in a CSI-RS resource set configured as repetition 'OFF' through a different Tx beam (or DL spatial domain transmission filter) of a base station (S720).

A terminal selects (or determines) the best beam (S740).

A terminal reports an ID and related quality information (e.g., L1-RSRP) of a selected beam to a base station (S740). In this case, reportQuantity of a CSI report configuration may be configured as 'CRI+L1-RSRP'.

In other words, when a CSI-RS is transmitted for BM, the terminal reports a CRI and a related L1-RSRP.

Figure 12:
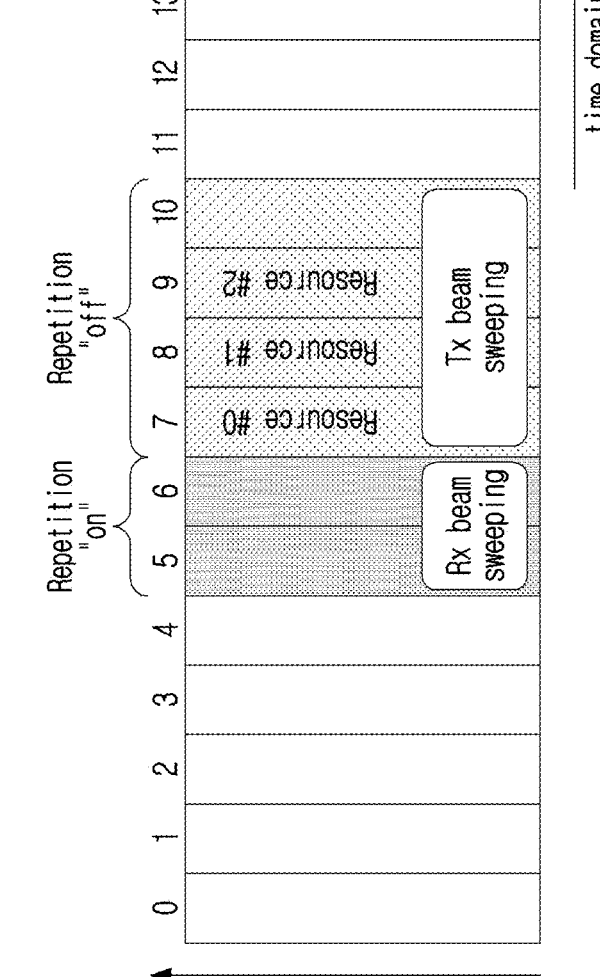
FIG. 12 is a diagram which illustrates resource allocation in a time and frequency domain related to a downlink beam management operation in a wireless communication system to which the present disclosure may be applied.

FIG. 12 is a diagram which illustrates resource allocation in a time and frequency domain related to a downlink beam management operation in a wireless communication system to which the present disclosure may be applied.

In reference to FIG. 12, it is shown that when repetition 'ON' is configured in a CSI-RS resource set, a plurality of CSI-RS resources are repetitively used by applying the same Tx beam and when repetition 'OFF' is configured in a CSI-RS resource set, different CSI-RS resources are transmitted in a different Tx beam.

Hereinafter, a beam indication method related to downlink BM will be described.

A terminal may be configured by RRC with a list of a maximum M candidate transmission configuration indication (TCI) states at least for a purpose of a QCL (Quasi Co-location) indication. Here, M may be 64.

Each TCI state may be configured as one RS set. Each ID of a DL RS at least for a spatial QCL purpose (QCL Type D) in a RS set may refer to one of DL RS types such as an SSB, a P(periodic)-CSI RS, an SP (semi-persistent)-CSI RS, an A(aperiodic)-CSI RS, etc.

An ID of DL RS(s) in a RS set used at least for a purpose of a spatial QCL may be initialized/updated at least by explicit signaling.

Table 7 illustrates a TCI-State information element (IE).

A TCI-State IE is associated with a quasi co-location (QCL) type corresponding to one or two DL reference signals (RS).

TABLE 7

```
ASN1START
TAG-TCI-STATE-START
TCI-State : :=        SEQUENCE {
tci-StateId          TCI-StateId,
qcl-Type1            QCL-Info,
qcl-Type2            QCL-Info
       OPTIONAL, -- Need R
. . .
}
```

TABLE 7-continued

```
QCL-Info : :=        SEQUENCE {
cell                         ServCellIndex
        OPTIONAL,    -- Need R
bwp-Id                       BWP-Id
        OPTIONAL, --     Cond CSI-RS-Indicated
referenceSignal              CHOICE {
csi-rs                       NZP-CSI-RS-ResourceId,
ssb                          SSB-Index
},
qcl-Type                     ENUMERATED {typeA, typeB, typeC, typeD},
. . .
}
TAG-TCI-STATE-STOP
-- ASN1STOP
```

In Table 7, a bwp-Id parameter represents a DL BWP (bandwidth part) where an RS is located, a cell parameter represents a carrier where a RS is located and a reference signal parameter represents reference antenna port(s) which is a source of a quasi co-location for corresponding target antenna port(s) or a reference signal including it. The target antenna port(s) may be a CSI-RS, a PDCCH DMRS, or a PDSCH DMRS. In an example, a corresponding TCI state ID (identifier) may be indicated in NZP CSI-RS resource configuration information to indicate QCL reference RS information for a NZP (non-zero power) CSI-RS. In another example, a TCI state ID may be indicated to each CORESET configuration to indicate QCL reference information for PDCCH DMRS antenna port(s). In another example, a TCI state ID may be indicated through DCI to indicate QCL reference information for PDSCH DMRS antenna port(s).

For UL BM, beam reciprocity (or beam correspondence) between a Tx beam and a Rx beam may be valid or may not be valid according to terminal implementation. If reciprocity between a Tx beam and a Rx beam is valid both in a base station and a terminal, a UL beam pair may be matched by a DL beam pair. But, when reciprocity between a Tx beam and a Rx beam is not valid in any one of a base station and a terminal, a process for determining a UL beam pair is required separately from a DL beam pair determination.

In addition, although both of a base station and a terminal maintain beam correspondence, a base station may use a UL BM procedure for determining a DL Tx beam without requesting a terminal to report a preferred beam.

UL BM may be performed through beamformed UL SRS transmission and whether UL BM of an SRS resource set is applied may be configured by a (higher layer parameter) usage. When a usage is configured as 'BeamManagement (BM)', only one SRS resource may be transmitted in each of a plurality of SRS resource sets in a given time instant.

A terminal may be configured with one or more SRS (Sounding Reference Symbol) resource sets configured by (a higher layer parameter) SRS-ResourceSet (through higher layer signaling, RRC signaling, etc.) For each SRS resource set, a UE may be configured with K≥1 SRS resources (a higher layer parameter SRS-resource). Here, K is a natural number and the maximum number of K is indicated by SRS_capability.

Like DL BM, an UL BM procedure may be also classified into Tx beam sweeping of a terminal and Rx beam sweeping of a base station.

Figure 13:
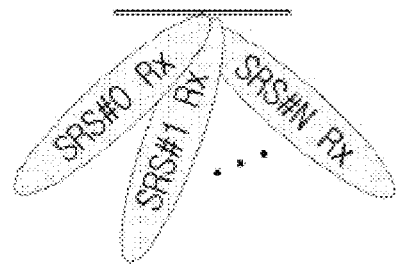
FIG. 13 is a diagram which illustrates an uplink beam management operation using SRS in a wireless communication system to which the present disclosure may be applied.
Figure 13:
Figure 13:
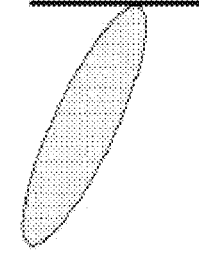
Figure 13:

FIG. 13 is a diagram which illustrates an uplink beam management operation using SRS in a wireless communication system to which the present disclosure may be applied.

FIG. 13(*a*) illustrates a Rx beam determination operation of a base station and FIG. 13(*b*) illustrates a Tx beam sweeping operation of a terminal.

Figure 14:
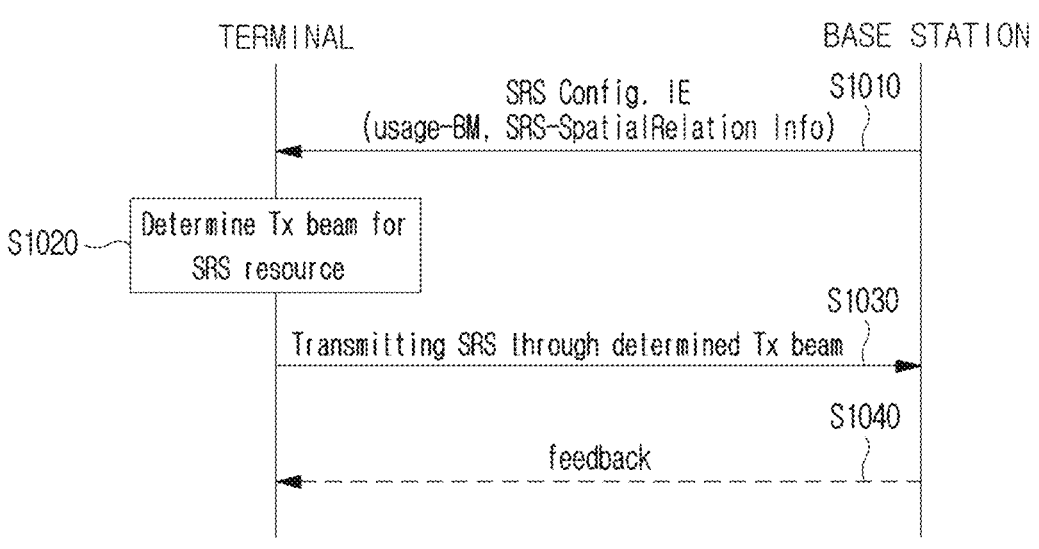
FIG. 14 is a diagram which illustrates an uplink beam management procedure in a wireless communication system to which the present disclosure may be applied.

FIG. 14 is a diagram which illustrates an uplink beam management procedure in a wireless communication system to which the present disclosure may be applied.

A terminal receives RRC signaling (e.g., an SRS-Config IE) including a (higher layer parameter) usage parameter configured as 'beam management' from a base station (S1010).

Table 8 represents an example of an SRS-Config IE (Information Element) and an SRS-Config IE is used for SRS transmission configuration. An SRS-Config IE includes a list of SRS-Resources and a list of SRS-ResourceSets. Each SRS resource set means a set of SRS-resources.

A network may trigger transmission of an SRS resource set by using configured aperiodicSRS-ResourceTrigger (L1 DCI).

TABLE 8

```
ASN1START
TAG-MAC-CELL-GROUP-CONFIG-START
SRS-Config : :=                              SEQUENCE {
srs-ResourceSetToReleaseList                  SEQUENCE         (SIZE (1..maxNrofSRS-
ResourceSets) ) OF SRS-ResourceSetId            OPTIONAL,        -- Need N
srs-ResourceSetToAddModList                   SEQUENCE         (SIZE (1..maxNrofSRS-
ResourceSets) ) OF SRS-ResourceSet              OPTIONAL,          -- Need N
srs-ResourceToReleaseList                     SEQUENCE         (SIZE (1..maxNrofSRS-
Resources) ) OF SRS-ResourceId                  OPTIONAL,        -- Need N
srs-ResourceToAddModList                      SEQUENCE         (SIZE (1..maxNrofSRS-
Resources) ) OF SRS-Resource                    OPTIONAL,        -- Need N
tpc-Accumulation                             ENUMERATED {disabled}
                                             OPTIONAL, -- Need S

. . .

}
SRS-ResourceSet : :=                          SEQUENCE {
srs-ResourceSetId                            SRS-ResourceSetId,
srs-ResourceIdList                           SEQUENCE         (SIZE (1..maxNrofSRS-
ResourcesPerSet) ) OF SRS-ResourceId            OPTIONAL,    -- Cond Setup
resourceType                                 CHOICE {
aperiodic                                     SEQUENCE {
aperiodicSRS-ResourceTrigger                   INTEGER (1..maxNrofSRS-TriggerStates-
1) ,
csi-RS                                         NZP-CSI-RS-ResourceId
                               OPTIONAL,       -- Cond NonCodebook
slotOffset                                     INTEGER (1..32)
                               OPTIONAL,      -- Need S

. . .

},
semi-persistent                               SEQUENCE {
associatedCSI-RS                               NZP-CSI-RS-ResourceId
                               OPTIONAL,       -- Cond NonCodebook

. . .

},
periodic                                      SEQUENCE {
associatedCSI-RS                               NZP-CSI-RS-ResourceId
                               OPTIONAL,       -- Cond NonCodebook

. . .

}
},
usage                                           ENUMERATED {beamManagement, codebook,
nonCodebook, antennaSwitching},
alpha                                           Alpha
                               OPTIONAL,        -- Need S
p0                                              INTEGER (-202..24)
                                                OPTIONAL,     -- Cond Setup
pathlossReferenceRS                             CHOICE {
ssb-Index                                         SSB-Index,
csi-RS-Index                                    NZP-CSI-RS-ResourceId
SRS-SpatialRelationInfo : :=                     SEQUENCE {
servingCellId                                   ServCellIndex
OPTIONAL, -- Need S
referenceSignal                                 CHOICE {
ssb-Index                                         SSB-Index,
csi-RS-Index                                    NZP-CSI-RS-ResourceId,
srs                                             SEQUENCE {
resourceId                                      SRS-ResourceId,
uplinkBWP                                       BWP-Id
}
}
}
SRS-ResourceId : :=                                                            INTEGER
(0..maxNrofSRS-Resources-1)
```

In Table 8, usage represents a higher layer parameter which indicates whether an SRS resource set is used for beam management or is used for codebook-based or non-codebook-based transmission. A usage parameter corresponds to a L1 parameter 'SRS-SetUse'. 'spatialRelation-Info' is a parameter which represents a configuration of a spatial relation between a reference RS and a target SRS. Here, a reference RS may be a SSB, a CSI-RS or a SRS corresponding to a L1 parameter 'SRS-SpatialRelationInfo'. The usage is configured per SRS resource set. A terminal determines a Tx beam for an SRS resource which will be transmitted based on SRS-SpatialRelation Info included in the SRS-Config IE (S1020). Here, SRS-SpatialRelation Info is configured per SRS resource and represents whether the same beam as a beam used in a SSB, a CSI-RS or a SRS will be applied per SRS resource. In addition, SRS-SpatialRelationInfo may be configured or may not be configured for each SRS resource.

If SRS-SpatialRelationInfo is configured for an SRS resource, the same beam as a beam used in a SSB, a CSI-RS or a SRS is applied and transmitted. But, if SRS-SpatialRelationInfo is not configured for an SRS resource, the terminal randomly determines a Tx beam and transmits an SRS through the determined Tx beam (S1030).

In more detail, for a P-SRS that 'SRS-ResourceConfig-Type' is configured as 'periodic':

i) when SRS-SpatialRelationInfo is configured as 'SSB/PBCH', a UE transmits a corresponding SRS resource by applying the same spatial domain transmission filter for generated by a corresponding filter) as a spatial domain Rx filter used for SSB/PBCH reception; or ii) when SRS-SpatialRelationInfo is configured as 'CSI-RS', a UE transmits a SRS resource by applying the same spatial domain transmission filter used for periodic CSI-RS or SP (semi-persistent) CSI-RS reception; or iii) when SRS-SpatialRelationInfo is configured as 'SRS', a UE transmits a corresponding SRS resource by applying the same spatial domain transmission filter used for periodic SRS transmission.

Although 'SRS-ResourceConfigType' is configured as 'SP (semi-persistent)-SRS' or 'AP (aperiodic)-SRS', a beam determination and transmission operation may be applied in a way similar to the above.

Additionally, a terminal may receive or may not receive a feedback on an SRS from a base station as in the following three cases (S1040).

i) when Spatial_Relation_Info is configured for all SRS resources in a SRS resource set, a terminal transmits an SRS with a beam indicated by a base station. For example, when Spatial_Relation_Info indicates all the same SSB, CRI or SRI, a terminal repetitively transmits an SRS with the same beam. This case corresponds to FIG. 13(a) as a usage for a base station to select an Rx beam.

ii) Spatial_Relation_Info may not be configured for all SRS resources in an SRS resource set. In this case, a terminal may transmit with freely changing SRS beams. In other words, this case corresponds to FIG. 13(b) as a usage for a terminal to sweep Tx beams.

iii) Spatial_Relation_Info may be configured only for a part of SRS resources in an SRS resource set. In this case, for a configured SRS resource, an SRS may be transmitted with an indicated beam, and for a SRS resource that Spatial_Relation_Info is not configured an SRS may be transmitted by randomly applying a Tx beam by a terminal.

Multi Panel Operations

'A panel' referred to in the present disclosure may be interpreted/applied as 'a plurality of (or at least one) panels' or 'a panel group' (having a similarity/a common value from a viewpoint of a specific characteristic (e.g., timing advance (TA), a power control parameter, etc.)). Alternatively, 'a panel' referred to in the present disclosure may be interpreted/applied as 'a plurality of (or at least one) antenna ports' or 'a plurality of (or at least one) uplink resources' or 'an antenna port group' or 'an uplink resource group (or set)' (having a similarity/a common value from a viewpoint of a specific characteristic (e.g., TA, a power control parameter, etc.)). Alternatively, 'a panel' referred to in the present disclosure may be interpreted/applied as 'a plurality of (or at least one) beams' or 'at least one beam group (or set)' (having a similarity/a common value from a viewpoint of a specific characteristic (e.g., TA, a power control parameter, etc.)). Alternatively, 'a panel' referred to in the present disclosure may be defined as a unit for a terminal to configure a transmission/reception beam. For example, 'a transmission panel' may generate a plurality of candidate transmission beams in one panel, but it may be defined as a unit which may use only one beam of them in transmission at a specific time. In other words, only one transmission beam (spatial relation information RS) may be used per Tx panel to transmit a specific uplink signal/channel. In addition, 'a panel' in the present disclosure may refer to 'a plurality of (or at least one) antenna ports' or 'an antenna port group' or 'an uplink resource group (or set)' with common/similar uplink synchronization and may be interpreted/applied as an expression which is generalized as 'an uplink synchronization unit (USU)'. In addition, 'a panel' in the present disclosure may be interpreted/applied as an expression which is generalized as 'an uplink transmission entity (UTE)'.

In addition, the 'uplink resource (or resource group)' may be interpreted/applied as a PUSCH/PUCCH/SRS/PRACH resource (or resource group (or set)). In addition, the interpretation/application may be interpreted/applied conversely. In addition, 'an antenna (or an antenna port)' may represent a physical or logical antenna (or antenna port) in the present disclosure.

In other words, 'a panel' referred to in the present disclosure may be variously interpreted as 'a terminal antenna element group', 'a terminal antenna port group', 'a terminal logical antenna group', etc. In addition, for which physical/logical antennas or antenna ports will be combined and mapped to one panel, a variety of schemes may be considered by considering a position/a distance/a correlation between antennas, a RF configuration, and/or an antenna (port) virtualization scheme, etc. Such a mapping process may be changed according to terminal implementation. In addition, 'a panel' referred to in the present disclosure may be interpreted/applied as 'a plurality of panels' or 'a panel group' (having a similarity from a viewpoint of a specific characteristic).

Hereinafter, multi-panel structures will be described.

Terminal modeling which installs a plurality of panels (e.g., configured with one or a plurality of antennas) in terminal implementation in a high-frequency band (e.g., bi-directional two panels in 3GPP UE antenna modeling). A variety of forms may be considered in implementing a plurality of panels of such a terminal. Contents described below are described based on a terminal which supports a plurality of panels, but they may be extended and applied to a base station (e.g., a TRP) which supports a plurality of panels. The after-described contents related to multi-panel structures may be applied to transmission and reception of a signal and/or a channel considering multi panels described in the present disclosure.

Figure 15:
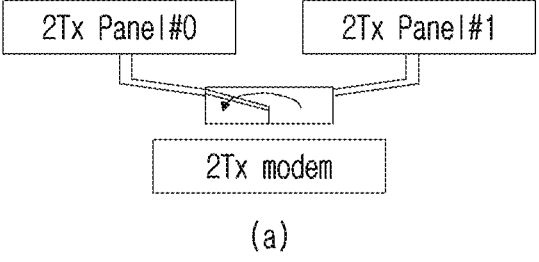
FIG. 15 is a diagram illustrating multi panel terminals in a wireless communication system to which the present disclosure may be applied.
Figure 15:
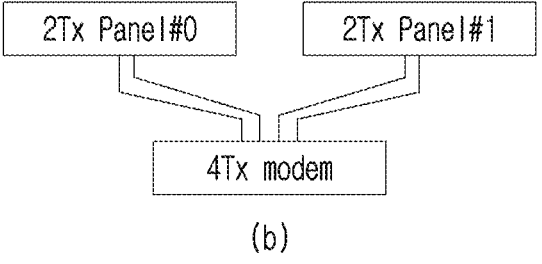

FIG. 15 is a diagram illustrating multi panel terminals in a wireless communication system to which the present disclosure may be applied.

FIG. 15(*a*) illustrates implementation of RF (radio frequency) switch-based multi panel terminals and FIG. 7(*b*) illustrates implementation of RF connection-based multi panel terminals.

For example, it may be implemented based on a RF switch as in FIG. 15(*a*). In this case, only one panel is activated for a moment and it may be impossible to transmit a signal for a certain duration of time to change an activated panel (i.e., panel switching).

For implementation of a plurality of panels in a different way, a RF chain may be connected respectively so that each panel can be activated anytime as in FIG. 7(*b*). In this case, time for panel switching may be 0 or too little. And, it may be possible to simultaneously transmit a signal by activating a plurality of panels at the same time (STxMP: simultaneous transmission across multi-panel) according to a model and power amplifier configuration.

For a terminal having a plurality of panels, a radio channel state may be different per panel, and in addition, a RF/antenna configuration may be different per panel, so a method in which a channel is estimated per panel is needed. In particular, a process in which one or a plurality of SRS resources are transmitted respectively per panel is needed to measure uplink quality or manage an uplink beam, or to measure downlink quality per panel or manage a downlink beam by utilizing channel reciprocity. Here, a plurality of SRS resources may be SRS resources which are transmitted by a different beam in one panel or may be SRS resources which are repeatedly transmitted by the same beam. Hereinafter, for convenience, a set of SRS resources transmitted in the same panel (a specific usage parameter (e.g., beam management, antenna switching, a codebook-based PUSCH, a non-codebook based PUSCH) and a specific time domain behavior (e.g., aperiodic, semi-persistent, or periodic)) may be referred to as an SRS resource group. For this SRS resource group, an SRS resource set configuration supported in a Rel-15 NR system may be utilized as it is or it may be configured separately by bundling one or a plurality of SRS resources (having the same time domain behavior and usage).

For reference, only when usage is beam management for the same usage and time domain behavior in Rel-15, a plurality of SRS resource sets may be configured. In addition, it is defined so that simultaneous transmission cannot be performed between SRS resources configured in the same SRS resource set, but simultaneous transmission can be performed between SRS resources belonging to a different SRS resource set. Accordingly, if panel implementation and simultaneous transmission of a plurality of panels as in FIG. 7(*b*) are considered, a corresponding concept (an SRS resource set) itself may be matched to an SRS resource group. But, an SRS resource group may be separately defined if even implementation (panel switching) as in FIG. 7(*a*) is considered. In an example, a configuration may be given by giving a specific ID to each SRS resource so that resources with the same ID belong to the same SRS resource group and resources with a different ID belong to a different resource group.

For example, it is assumed that 4 SRS resource sets configured for BM usage (RRC parameter usage is configured as 'BeamManagement') are configured to a UE. Hereinafter, for convenience, each is referred to as SRS resource set A, B, C, D. In addition, a situation which applies is considered implementation performing SRS transmission by corresponding each of the sets to one (Tx) panel because UE implements a total of 4 (Tx) Panels.

TABLE 9

| The maximum number of SRS resource sets across all time domain behaviors (periodic/semi-persistent/ aperiodic) reported in 2-30 | Additional limit to the maximum number of the maximum SRS resource sets per supported time domain behavior (periodic/ semi-persistent/aperiodic) |
|---|---|
| 1 | 1 |
| 2 | 1 |
| 3 | 1 |
| 4 | 2 |
| 5 | 2 |
| 6 | 2 |
| 7 | 4 |
| 8 | 4 |

In Rel-15 standards, such UE implementation is more clearly supported by the following agreement. In other words, for a UE which performs capability reporting for a value reported in feature group (FG) 2-30 as 7 or 8 in Table 6, a total of up to 4 SRS resource sets for BM (per supported time domain behavior) may be configured as in the right column of Table 6. As above, implementation which performs transmission by corresponding one UE panel to each set may be applied. Here, when 4 panel UE corresponds each panel to one SRS S resource set for BM and transmits it, the number itself of configurable SRS resources per each set is also supported by separate UE capability signaling. For example, it is assumed that 2 SRS resources are configured in the each set. It may correspond to 'the number of UL beams' which may be transmitted per panel. In other words, the UE may respectively correspond 2 UL beams to 2 configured SRS resources per each panel and transmit them when 4 panels are implemented. In this situation, according to Rel-15 standards, one of a codebook (CB)-based UL or non-codebook (NCB)-based UL mode may be configured for final UL PUSCH transmission scheduling. In any case, only one SRS resource set (having usage set as "CB-based UL" or "NCB-based UL") configuration, i.e., only one dedicated SRS resource set (for a PUSCH) configuration, is supported in Rel-15 standards.

Hereinafter, multi panel UE (MPUE) categories will be described.

Regarding the above-described multi panel operations, the following 3 MPUE categories may be considered. Specifically, 3 MPUE categories may be classified according to i) whether multiple panels may be activated and/or ii) transmission using multiple panels may be possible.

i) MPUE category 1: In a terminal that multiple panels are implemented, only one panel may be activated at a time. A delay for panel switching/activation may be configured as [X] ms. In an example, the delay may be configured to be longer than a delay for beam switching/activation and may be configured in a unit of a symbol or in a unit of a slot. MPUE category 1 may correspond to MPUE-assumption1 described in standardization-related documents (e.g., a 3gpp agreement, a technical report (TR) document and/or a technical specification (TS) document, etc.).

ii) MPUE category 2: In a terminal that multiple panels are implemented, multiple panels may be activated at a time. One or more panels may be used for transmission. In other words, simultaneous transmission using panels may be performed in a corresponding category. MPUE category 2 may correspond to MPUE-assumption2 described in standardization-related documents (e.g., a 3gpp agreement, a TR document and/or a TS document, etc.).

iii) MPUE category 3: In a terminal that multiple panels are implemented, multiple panels may be activated at a time, but only one panel may be used for transmission. MPUE category 3 may correspond to MPUE-assumption3 described in standardization-related documents (e.g., a 3gpp agreement, a TR document and/or a TS document, etc.).

Regarding multi panel-based signal and/or channel transmission and reception suggested in the present disclosure, at least one of the above-described 3 MPUE categories may be supported. In an example, in Rel-16, MPUE category 3 of the following 3 MPUE categories may be (selectively) supported.

In addition, information on a MPUE category may be predefined in specifications (i.e., standards). Alternatively, information on a MPUE category may be configured semi-statically and/or may be indicated dynamically according to a system situation (i.e., a network aspect, a terminal aspect). In this case, a configuration/an indication, etc. related to multi panel-based signal and/or channel transmission and reception may be configured/indicated by considering a MPUE category.

Hereinafter, a configuration/an indication related to panel-specific transmission/reception will be described.

Regarding a multi panel-based operation, signal and/or channel transmission and reception may be performed in a panel-specific way. Here, being panel-specific may mean that signal and/or channel transmission and reception in a unit of a panel may be performed. Panel-specific transmission and reception may be referred to as panel-selective transmission and reception.

Regarding panel-specific transmission and reception in a multi panel-based operation suggested in the present disclosure, a method of using identification information (e.g., an identifier (ID), an indicator, etc.) for configuring and/or indicating a panel which will be used for transmission and reception among one or more panels may be considered.

In an example, an ID for a panel may be used for panel-selective transmission of a PUSCH, a PUCCH, an SRS, and/or a PRACH among activated multiple panels. The ID may be configured/defined based on at least any one of the following 4 methods (options (Alts) 1, 2, 3, 4).

i) Alt.1: An ID for a panel may be an SRS resource set ID.

In an example, it may be desirable to correspond each UE Tx panel to an SRS resource set configured in terms of terminal implementation when considering a) an aspect that SRS resources of multiple SRS resource sets having the same time domain behavior are simultaneously transmitted in the same BWP, b) an aspect that a power control parameter is configured in a unit of an SRS resource set, c) an aspect that a terminal may report up to 4 SRS resource sets (they may correspond to up to 4 panels) according to a supported time domain behavior. In addition, an Alt.1 scheme has an advantage that an SRS resource set related to each panel may be used for 'codebook' and 'non-codebook'-based PUSCH transmission. In addition, for an Alt.1 scheme, multiple SRS resources belonging to multiple SRS resource sets may be selected by extending an SRI (SRS resource indicator) field of DCI. In addition, a mapping table of an SRI to SRS resource may need to be extended to include SRS resources in the whole SRS resource set.

ii) Alt.2: An ID for a panel may be an ID which is (directly) associated with a reference RS resource and/or a reference RS resource set.

ii) Alt.3: An ID for a panel may be an ID which is directly associated with a target RS resource (a reference RS resource) and/or a reference RS resource set.

An Alt.3 scheme has an advantage that configured SRS resource set(s) corresponding to one UE Tx panel may be controlled more easily and that the same panel identifier may be allocated to multiple SRS resource sets having a different time domain behavior.

iv) Alt.4: An ID for a panel may be an ID which is additionally configured to spatial relation information (e.g., RRC_SpatialRelationInfo).

An Alt. 4 scheme may be a scheme which newly adds information for representing an ID for a panel. In this case, it has an advantage that configured SRS resource sets corresponding to one UE Tx panel may be controlled more easily and that the same panel identifier may be allocated to multiple SRS resource sets having a different time domain behavior.

In an example, a method of introducing an UL TCI similarly to the existing DL TCI (Transmission Configuration Indication) may be considered. Specifically, definition of a UL TCI state may include a list of reference RS resources (e.g., an SRS, a CSI-RS and/or an SSB). A current SRI field may be reused to select a UL TCI state from a configured set or a new DCI field of DCI format 0_1 (e.g., a UL-TCI field) may be defined for a corresponding purpose.

Information related to the above-described panel-specific transmission and reception (e.g., a panel ID, etc.) may be transmitted by higher layer signaling (e.g., a RRC message, MAC-CE, etc.) and/or lower layer signaling (e.g., layer1 (L1: Layer1) signaling, DCI, etc.). Corresponding information may be transmitted from a base station to a terminal or may be transmitted from a terminal to a base station according to a situation or if necessary.

In addition, corresponding information may be configured by a hierarchical method which configures a set for a candidate group and indicates specific information.

In addition, the above-described identification information related to a panel may be configured in a unit of a single panel or in a unit of multiple panels (e.g., a panel group, a panel set).

Uplink/Downlink Signal Transmission/Reception Method

In this disclosure, in a transmission beam (Tx beam)/reception beam (Rx beam) configuration of a terminal by a base station, a method for performing switch/update of transmission parameter (e.g., spatial relation and/or QCL type-D RS, etc.) for specific target channel/reference signal (RS) (s) will be proposed, and a subsequent Tx beam/Rx beam decision operation of terminal will be proposed.

As described above, By utilizing the QCL (Quasi Co-Located) concept introduced in (Rel-15) NR, a transmission configuration indication (TCI) is used for configuring/indicating, by a base stateion to a terminal, a Rx beam (i.e., spatial Rx parameter) which is used when the terminal receive PDCCH and PDSCH (specifically, when the terminal receive DMRS of the PDCCH and the PDSCH). In addition, the base station configures/updates to the terminal a DL reference signal (e.g., SS/PBCH block resource indicator (SSB-RI), CSI-RS resource indicator (CRI) (Periodic (P)/semi-persistent (SP)/Aperiodic (AP))) as a reference RS or a source RS of QCL Type-D component for PDCCH and PDSCH (i.e., DMRS of PDCCH and PDSCH) through the corresponding TCI state. By doing this, the terminal may utilize the Rx beam when receiving the DL RS configured as a reference when receiving the PDCCH or PDSCH.

In addition, in Rel-15 NR, spatial relationship information (i.e., higher layer parameter spatialRelationInfo) may be used to configure/indicate a Tx beam to be used when a base station transmits a UL channel to a terminal. The base station configures/updates DL RS (i.e., SSB-RI, CRI (P/SP/AP)) or SRS (i.e., SRS resource) as a reference RS for a target UL channel and/or a target RS, through RRC configuration and/or MAC CE activation. By doing this, when the terminal transmits PUCCH and SRS, it is possible to configure/ indicate which UL Tx beam (i.e., spatial Tx parameter) to utilize. In addition, when the base station schedules the PUSCH to the terminal, the Tx beam used for SRS transmission (for codebook (CB) or non-codebook (NCB)) configured/updated/instructed by the base station may be used as a PUSCH Tx beam of the terminal by indicating it as a Tx beam for a PUSCH through SRS resource indication (SRI) field of UL grant DCI.

Hereinafter, an update operation for a Rx/Tx beam of a terminal will be described.

In Rel-15 NR, TCI state configuration is used for Rx beam configuration/indication for target DL RS/channel. i) When the target DL RS/channel is CSI-RS, the terminal Rx beam may be configured by configuring the QCL type-D RS through RRC signaling (i.e., through TCI state identity (ID) configuration within the TCI state pool). ii) When the target DL RS/channel is PDCCH, by indicating a specific TCI state ID through a MAC CE message among up to 64 TCI state IDs configured in a specific control resource set (CORE-SET), the UE Rx beam for the PDCCH may be configured. Also, the Rx beam of the corresponding CORESET may be updated through the same MAC CE message. iii) when the target DL RS/channel is PDSCH, up to 8 TCI state IDs (within a maximum of 128 TCI state pools) are connected to the TCI state field of DL DCI through MAC CE, and during DL scheduling, the PDSCH Rx beam may be indicated through an indication by a TCI state field. In addition, the PDSCH Rx beam may be updated by updating the TCI state ID connected to the TCI state field through the same MAC CE message.

In Rel-16 NR, in order to reduce the overhead of DL Rx beam configuration/indication, in multiple component carriers (CCs) (or bandwidth parts (BWPs) for PDCCH and PDSCH, the operation between the base station terminals is enhanced to enable simultaneous TCI state ID activation through MAC CE messages.

In Rel-15 NR, spatial relation information (i.e., higher layer parameter spatialRelationInfo) is used to configure/ indicate a Tx beam for a target UL RS/channel. i) When the target UL RS/channel is PUCCH, the PUCCH spatial relation information identifier (i.e., higher layer parameter PUCCH-SpatialRelation InfoId) s connected to each PUCCH resource through a MAC CE message, so that the Tx beam for each PUCCH resource may be configured. In addition, the MAC level for PUCCH-SpatialRelationInfo may be updated through the same MAC CE message. ii) When the target UL RS/channel is SRS, SRS-SpatialRelationInfo of SRS resources in the semi-persistent SRS resource set may be updated through a MAC CE message that activates SRS transmission for semi-persistent (SP)-SRS.

In Rel-16 NR, in order to reduce the latency of UL Tx beam configuration/indication, an operation between base station terminals has been improved SO that SRS-Spatial-Relation Info of SRS resources in a corresponding aperiodic SRS resource set may be updated through a MAC CE message for AP (aperiodic)-SRS. In addition, like the DL Rx beam, an operation between base station terminals has been improved so that the simultaneous spatial relation reference RS (RS) in multiple CCs (BWP) for the SP-SRS and AP-SRS may be updated through the MAC CE message. In addition, the concept of a PUCCH resource group (per BWP) has been introduced, and operation between base station and terminal has been improved to enable simultaneous spatial relation update for PUSCH resources within the corresponding PUCCH resource group.

Hereinafter, an agreement on eNR MIMO multi-beam enhancement in Rel-16 will be described.

In Rel-16, an identifier (ID) that can be used at least for indicating panel-specific UL transmission is supported. The ID may be defined by reusing/modifying an identifier supported in Rel-15 specification or as introducing new ID.

An identifier (ID) that may be used at least for indicating panel-specific UL transmission may be to be down-selected or merged from the following alternatives.

Alt.1: SRS resource set
Alt.2: an ID, which is directly associated to a reference RS resource and/or resource set
Alt.3: an ID, which can be assigned for a target RS resource or resource set
Alt.4: an ID which is additionally configured in spatial relation info The following multi-panel UE (MPUE) categories may be used.

MPUE-Assumption1: Multiple panels may be implemented on a UE and only one panel may be activated at a time, with panel switching/activation delay of [X] ms.

MPUE-Assumption2: Multiple panels may be implemented on a UE and multiple panels may be activated at a time and one or more panels may be used for transmission MPUE-Assumption3: Multiple panels may be implemented on a UE and multiple panels may be activated at a time but only one panel may be used for transmission In Rel-16, only introduce specification enhancement for MPUE-Assumption3 has been introduced.

MPUE-Assumption3: Multiple panels may be implemented on a UE and multiple panels may be activated at a time but only one panel may be used for transmission. In here, it is not required that the UE always activate multiple panels at the same time. The UE may control panel activation/deactivation.

A possible use case may include (general) UL coverage enhancement for FR2 considering UE power consumption.

A base station (gNB) may configure/indicate panel-specific transmission for UL transmission, via:

Alt.2: The UL-TCI framework in Rel-16 is introduced, and UL-TCI is supported based on signaling similar to the DL beam indication supported in Rel-15.

Here, a new panel ID may or may not be introduced. Panel specific signaling is performed using the UL-TCI state.

Alt.3: A new panel-ID is introduced, which implicitly transmits for a target RS resource or resource set, for a PUSCH resource, for an SRS resource, and for a physical random access channel (PRACH) may be applied implicitly/ explicitly.

Here, panel specific signaling is performed either implicitly (e.g., by DL beam reporting enhancement) or explicitly using the new panel-ID.

If explicitly signaled, the ID may be configured in target RS/channel or reference RS (e.g., in DL RS resource configuration or spatial relation info).

A new MAC CE is not defined for the purpose of introducing an ID.

Table 10 illustrates the UL-TCI states in Alt.2.

TABLE 10

| Valid UL-TCI state configuration | Source (reference) RS | (target) UL RS | [qcl-Type] |
|---|---|---|---|
| 1 | (for BM) SRS resource + [panel ID] | DM-RS for PUCCH or SRS for PRACH | Spatial-relation |
| 2 | DL RS (CSI-RS resource or SSB) + [panel ID] | DM-RS for PUCCH or SRS for PRACH | Spatial-relation |
| 3 | DL RS (CSI-RS resource or SSB) + [panel ID] | DM-RS for PUSCH | Spatial-relation + [port (s)-indication] |
| 4 | DL RS (CSI-RS resource or SSB) and SRS resource + [panel ID] | DM-RS for PUSCH | Spatial-relation + [port (s)-indication] |
| 5 | SRS resource + [panel ID] | DM-RS for PUSCH | Spatial-relation + [port (s)-indication] |
| 6 | UL RS (SRS for BM) and SRS resource + [panel ID] | DM-RS for PUSCH | Spatial-relation + [port (s)-indication] |

(As agreed upon in the above-described Rel-16 eNR MIMO) It is expected that UL-TCI will be introduced in Rel-17 as integrated framework for a base station to indicate a transmission panel/beam in a UL RS/channel of a terminal (see work item description (WID) described later). This is an extension of DL-TCI in Rel-15 NR to UL, and DL RS (e.g., SSB-RI, CRI) or UL RS (e.g., SRS) may be configured as a reference RS or a source RS which is used/applied for a Tx beam for a target UL channel (e.g., PUCCH, PUSCH, PRACH) or a target UL RS (e.g., SRS), through RRC configuration. Accordingly, when transmitting the corresponding target RS/channel, the terminal may utilize the corresponding reference Tx beam. This UL-TCI framework basically has the same purpose as the frame structure of spatial relation in for (spatialRelationInfo) of the existing Rel-15. However, compared to SRI-based PUSCH scheduling and PUSCH beam indication, in which SRS for 'CB' or 'non-CB' purposes must be transmitted before SRI indication for PUSCH transmission, there is an advantage in that overhead and delay for PUSCH beam indication may be reduced. In addition, in all UL RS/channels such as PUCCH/PUSCH/SRS, it is also meaningful in establishing a DL RS/channel and an unified Tx beam indication method. Additionally, in the NR standard to date, only DL RS (e.g., SSB-RI, CRI) is supported as the QCL type-D reference RS for the target DL RS/channel, and SRS, which is a UL RS, is also expected to be enhanced so that it may be used as a QCL type-D reference RS. In this case, it is meaningful to expand the SRS Tx beam used for UL transmission to be used as a Rx beam for DL RS/channel reception.

Hereinafter, a Rel-17 FeMIMO WID for multi-beam enhancement is described.

Enhancement on multi-beam operation, mainly targeting FR2 while also applicable to FR1:
  a. Identify and specify features to facilitate more efficient (lower latency and overhead) DL/UL beam management to support higher intra- and Layer1 (L1)/Layer2 (L2)-centric inter-cell mobility and/or a larger number of configured TCI states:
    i. Common beam for data and control transmission/reception for DL and UL, especially for intra-band carrier aggregation (CA)
    ii. Unified TCI framework for DL and UL beam indication
    iii. Enhancement on signaling mechanisms for the above features to improve latency and efficiency with more usage of dynamic control signaling (as opposed to RRC)
  b. Identify and specify features to facilitate UL beam selection for UEs equipped with multiple panels, considering UL coverage loss mitigation due to MPE, based on UL beam indication with the unified TCI framework for UL fast panel selection However, even if the above-described TCI configuration (i.e., TCI state configuration) is extended to UL RS/channel, when updating the Rx/Tx beam of the terminal in DL TCI configuration and UL TCI configuration, In order for the base station to update the Rx/Tx beam for a specific target DL/UL RS/channel to the terminal, there is a disadvantage that individual MAC CE messages for the specific target DL/UL RS/channel must be transmitted do. That is, in order to update the Rx/Tx beam of the terminal related to the DL/UL channel/RS, the MAC CE must be individually transmitted for each channel/RS. For example, in the case of CSI-RS, MAC CE update is possible for semi-persistent (SP)-CSI-RS, in the case of PDCCH, MAC CE update is possible for a specific control resource set (CORESET), in the case of PUCCH, MAC CE update is possible for each PUCCH resource group, and in the case of SRS, MAC CE update is possible for SRS resources within a specific semi-persistent (SP)-SRS or aperiodic (AP)-SRS resource set. Based on this background, in the present disclosure, for a Rx/Tx beam configuration of the terminal, a method for performing, by the base station, switch/update of spatial relation and/or QCL type-D RS for specific target (DL/UL) channel/RS(s) will be proposed, and a subsequent Tx beam/Rx beam decision operation of terminal will be proposed.

Hereinafter, a Rx beam to be used when receiving a PDCCH/PDSCH in this document can be interpreted/applied as a Rx beam to be used when receiving a DMRS of the PDCCH/PDSCH, respectively.

In the present invention, '/' may be interpreted as 'and', 'or', or 'and/or' depending on the context.

In the present disclosure, an update of the Rx beam for the DL channel/RS (e.g., PDCCH, PDSCH, CSI-RS, etc.) of the terminal may mean an update of the reference RS of QCL type-D configured by the TCI state for the DL channel/RS of the terminal. However, this is for convenience of description, and in the present disclosure, an update of the Rx beam for the DL channel/RS of the terminal may mean an update of the TCI state for the DL channel/RS of the terminal (i.e., update/change of TCI state ID).

In addition, in the present disclosure, an update of a Tx beam on a UL channel/RS (e.g., PUCCH, PUSCH, SRS, etc.) of a terminal may mean an update of a spatial relation reference RS for a UL channel/RS of a terminal. In addition, it may mean updating the QCL type-D reference RS configured by the TCI state for the UL channel/RS of the terminal. However, this is for convenience of description, and in the present disclosure, an update of the Tx beam for the UL channel/RS of the terminal may mean an update of spatial relation info for the UL channel/RS of the terminal (i.e., update/change of spatial relation info ID). In addition, in the present disclosure, an update of the Tx beam for the UL channel/RS of the terminal may mean an update of the TCI state for the UL channel/RS of the terminal (i.e., update/change of TCI state ID).

In addition, in the present disclosure, spatial relation info and TCI state may be referred to as transmission parameters for a UL channel/RS. In this case, an update of the transmission parameters may mean an update of the TCI state for the UL channel/RS and/or the DL channel/RS (or update of spatial relation info).

Further, in the present disclosure, an update of a transmission parameter may be interpreted as activation and/or inactivation of the transmission parameter. That is, it may be interpreted as activation of the TCI state and/or activation and/or inactivation of spatial relation info. For example, it may be interpreted as an operation of activating and/or inactivating a specific transmission parameter (i.e., TCI state and/or spatial relation info) among configured transmission parameter (i.e., TCI state and/or spatial relation info) candidates (e.g., already activating a new specific transmission parameter while deactivating an activated specific transmission parameter).

In addition, in the present disclosure, for convenience of explanation, a united TCI state for the DL channel/RS and the UL channel/RS is exemplified and described, but for the UL channel/RS, the TCI state is spatial relation info.

In addition, in the present disclosure, DL channel/RS and/or UL channel/RS referring to the same reference RS may be interpreted as DL channel/RS and/or UL channel/RS for which the same TCI state ID is configured. In addition, since the TCI state may be interpreted as spatial relation info for the UL channel/RS, in this case, the UL channel/RS referring to the same reference RS may be interpreted as a UL channel/RS configured with the same spatial relation info ID. In particular, in an update operation for both a DL channel/RS and a UL channel/RS that refer to the same reference RS, the TCI state ID may be interpreted equivalently to the spatial relation info ID.

Also, in the present disclosure, RS/channel may refer to only RS, only channel, or both RS and channel. Also, UL RS/channel and/or DL RS/channel may refer to only UL RS/channel, only DL RS/channel, or both UL RS/channel and DL RS/channel.

Embodiment 1: A method for a base station to update Rx beams for multiple DL RS/channels and/or Tx beams for multiple UL RS/channels of a terminal That is, in embodiment 1, a method for updating, by a base station, TCI state (or reference RS of QCL type-D in TCI stae) or spatial relation info for a plurality of DL RS/channel and/or a plurality of UL RS/channel of a terminal will be proposed.

In order for low latency and fast beam change Beam update, the base station may perform Rx beam update (or TCI state ID update) and/or Tx beam update (or TCI state ID update or spatial relation Info ID update) of a specific target DL/UL RS/channel(s) of the terminal as follows.

Specifically, when the base station updates a QCL type-D reference RS or spatial relation reference RS (or reference RS of Tx beam by UL TCI) for the Rx beam and/or Tx beam of the specific target DL/UL RS/channel(s) (by RRC signaling or by MAC CE), the following operation may be performed.

The base station may configure/indicate to terminal to perform a unified Rx/Tx beam update with a update-indicated reference RS through the update (by RRC signaling or MAC CE), for all DL/UL RS/channel(s) to which the terminal refers to the reference RS (to be updated) to determine the Rx/Tx beam. That is, the update to the indicated reference RS is performed not only for the target DL/UL channel/RS, but also for all DL/UL RS/channel(s) that refer to the reference RS (for determining the Rx/Tx beam) that is the update target. The terminal may perform an update of QCL type-D RS or/and spatial relation reference RS for a plurality of DL/UL RS/channels through single signaling of the base station (by RRC signaling or MAC CE).

The unified Rx/Tx beam update for the UE-specific DL/UL RS/channel(s) may be turned on/off by an RRC level enabler (i.e., RRC parameter). That is, when on is indicated by the enabler (or when the enabler is configured), a reference RS of all DL/UL RS/channels that refer to the same reference RS other than the target DL/UL RS/channel may be updated. That is, when off is indicated by the enabler (or if the enabler is not configured), the reference RS may be updated only for the target DL/UL RS/channel as before. For example, an RRC parameter related to enabling of the unified Rx/Tx beam update may be configured. The corresponding parameter may indicate on/off of unified Rx/Tx beam update.

The unified Rx/Tx beam update (or TCI state ID update or spatial relation Info ID update) for the UE-specific DL/UL RS/channel(s) may follow at least one of the following options according to whether a target RS/channel is a DL RS/channel or an UL RS/channel.

Option 1) When the target RS/channel to perform the unified Rx/Tx beam update is a DL RS/channel, the terminal may perform unified Rx beam update with reference RSs for which update is indicated for all DL RS/channels to which the Rx beam reference RS referred by the corresponding target RS/channel is referred together. This embodiment will be described in detail with reference to Tables 11 to 13 below.

Table 11 illustrates a DL/UL unified TCI framework.

TABLE 11

| DL/UL TCI-state ID | Source (reference) RS | qcl-Type |
|---|---|---|
| 1 | SRS resource 5 (for BM) | Type D or spatial relation |
| 2 | SSB 3 | Type D or spatial relation |
| 3 | CSI-RS resource 2 | Type D or spatial relation |
| 4 | SRS resource 9 (for BM) | Type D or spatial relation |
| 5 | CSI-RS resource 12 | Type D or spatial relation |
| 6 | CSI-RS resource 4 | Type D or spatial relation |

Table 11 is an example of DL/UL unified TCI state configuration. The TCI state indexes 1 to 6 may be referred to as QCL type-D reference RSs of a specific DL RS/channel as shown in Table 12 below. Also, it may be referred to as a spatial relation reference RS of a specific UL RS/channel (or a reference RS of a transmission beam by UL TCI). For example, when the TCI state index/identifier (ID) for a specific DL/UL RS/channel is configured to 2, the specific DL/UL RS/channel may refer SSB 3 to a reference RS of QCL type D or spatial relation reference RS.

Table 12 illustrates a Rx/Tx beam reference situation of a DL/UL RS/channel in a specific BWP before update.

TABLE 12

| | Target DL/UL RS/channel | (For Rx/Tx beam) Reference TCI state ID |
|---|---|---|
| Downlink | CORESET 1 | TCI state ID 2 |
| | CORESET 2 | TCI state ID 1 |
| | CORESET 3 | TCI state ID 5 |
| | (For PDSCH) activated TCI state 1 | TCI ID 2 |
| | (For PDSCH) activated TCI state 2 | TCI state ID 3 |
| | (For PDSCH) activated TCI state 3 | TCI state ID 1 |
| | (For PDSCH) activated TCI state 4 | TCI state ID 5 |
| | CSI-RS resource 1 | TCI state ID 2 |
| | CSI-RS resource 3 | TCI state ID 1 |
| Uplink | PUCCH resource 1 | TCI state ID 5 |
| | PUCCH resource 2 | TCI state ID 1 |
| | PUCCH resource 3 | TCI state ID 3 |
| | (CB usage) SRS resource 1 | TCI state ID 1 |
| | (CB usage) SRS resource 2 | TCI state ID 5 |
| | (antenna switching usage) SRS resource 13 | TCI state ID 3 |
| | (antenna switching usage) SRS resource 15 | TCI state ID 5 |

In Table 12 above, when the base station updates TCI state ID 1, which was referred to for the Rx beam of CORESET 2 by option 1, to TCI state ID 6 (i.e., when the base station transmits a RRC/MAC message for updating the TCI state ID for CORESET 2 to the terminal, and TCI state ID 6 is indicated by the corresponding RRC/MAC message), as shown in Table 13 below, the terminal may perform the same update for all DL RS/channels referring to TCI state ID 1 (for Rx beam). That is, through the Rx beam update of CORESET 2 (by single RRC/MAC level signaling), the activated TCI state 3 (for PDSCH) and the Rx beam of CSI-RS resource 3 are equally updated. (i.e., updated to TCI state ID 6). In other words, when the TCI state ID of the target DL channel/RS is updated from x to y by option 1, a TCI state ID for all DL RS/channels may be updated to TCI state ID y. Therefore, it is possible to reduce overhead and latency in updating the Rx beam of the terminal.

Table 13 illustrates a Rx/Tx beam reference situation of a DL/UL RS/channel in a specific BWP after update (option 1).

TABLE 13

| | Target DL/UL RS/channel | (For Rx/Tx beam) Reference TCI state ID |
|---|---|---|
| Downlink | CORESET 1 | TCI state ID 2 |
| | CORESET 2 | TCI state ID 6 |
| | CORESET 3 | TCI state ID 5 |
| | (For PDSCH) activated TCI state 1 | TCI state ID 2 |
| | (For PDSCH) activated TCI state 2 | TCI state ID 3 |
| | (For PDSCH) activated TCI state 3 | TCI state ID 6 |
| | (For PDSCH) activated TCI state 4 | TCI state ID 5 |
| | CSI-RS resource 1 | TCI state ID 2 |
| | CSI-RS resource 3 | TCI state ID 6 |
| Uplink | PUCCH resource 1 | TCI state ID 5 |
| | PUCCH resource 2 | TCI state ID 1 |
| | PUCCH resource 3 | TCI state ID 3 |
| | (CB usage) SRS resource 1 | TCI state ID 1 |
| | (CB usage) SRS resource 2 | TCI state ID 5 |

TABLE 13-continued

| | Target DL/UL RS/channel | (For Rx/Tx beam) Reference TCI state ID |
|---|---|---|
| | (antenna switching usage) SRS resource 13 | TCI state ID 3 |
| | (antenna switching usage) SRS resource 15 | TCI state ID 5 |

The above-described embodiment is just one example in the DL/UL unified TCI framework, and option 1 may be applied even when DL TCI-related operations and spatial relation-related operations are mixed. That is, even when a spatial relation info identifier (ID) is configuration for the UL channel/RS, the above option 1 may be equally applied.

Option 2) When the target RS/channel to perform the unified Rx/Tx beam update is a UL RS/channel, the terminal may perform unified Tx beam update with reference RSs for which update is indicated for all UL RSs/channels to which the Tx beam reference RS referred to by the corresponding target RS/channel is referred together. Referring to Table 14 below, this embodiment will be described in detail.

In Table 12 above, when the base station updates TCI state ID 1, which was referred to for the Tx beam of PUCCH resource 2 by option 2, to TCI state ID 6 (i.e., when the base station transmits a RRC/MAC message for updating the TCI state ID for PUCCH resource 2 to the terminal, and TCI state ID 6 is indicated by the corresponding RRC/MAC message), as shown in Table 14 below, the terminal may perform the same update for all DL RS/channels referring to TCI state ID 1 (for Tx beam). That is, through the Tx beam update of PUCCH resource 2 (by single RRC/MAC level signaling), the Tx beam of (CB usage) SRS resource 1 is equally updated.

In other words, when the TCI state ID (or spatial relation info ID) of the target DL channel/RS is updated from x to y by option 2, a TCI state ID (or spatial relation info ID) for all DL RS/channels that referenced TCI state ID x (where TCI state ID x is configured or where spatial relation info ID x is configured) may be updated to TCI state ID y (or spatial relation info ID y). Therefore, it is possible to reduce overhead and latency in updating the Tx beam of the terminal.

Table 14 illustrates a Rx/Tx beam reference situation of a DL/UL RS/channel in a specific BWP after update (option 2).

TABLE 14

| | Target DL/UL RS/channel | (For Rx/Tx beam) Reference TCI state ID |
|---|---|---|
| Downlink | CORESET 1 | TCI state ID 2 |
| | CORESET 2 | TCI state ID 1 |
| | CORESET 3 | TCI state ID 5 |
| | (For PDSCH) activated TCI state 1 | TCI state ID 2 |
| | (For PDSCH) activated TCI state 2 | TCI state ID 3 |
| | (For PDSCH) activated TCI state 3 | TCI state ID 1 |
| | (For PDSCH) activated TCI state 4 | TCI state ID 5 |
| | CSI-RS resource 1 | TCI state ID 2 |
| | CSI-RS resource 3 | TCI state ID 1 |
| Uplink | PUCCH resource 1 | TCI state ID 5 |
| | PUCCH resource 2 | TCI state ID 6 |
| | PUCCH resource 3 | TCI state ID 3 |

TABLE 14-continued

| Target DL/UL RS/channel | (For Rx/Tx beam) Reference TCI state ID |
| --- | --- |
| (CB usage) SRS resource 1 | TCI state ID 6 |
| (CB usage) SRS resource 2 | TCI state ID 5 |
| (antenna switching usage) SRS resource 13 | TCI state ID 3 |
| (antenna switching usage) SRS resource 15 | TCI state ID 5 |

The above-described embodiment is just one example in the DL/UL unified TCI framework, and option 2 may be applied even when DL TCI-related operations and spatial relation-related operations are mixed. That is, even when a spatial relation info identifier (ID) is configuration for the UL channel/RS, the above option 1 may be equally applied. Option 3) Regardless of whether the target RS/channel to perform the unified Rx/Tx beam update is a DL RS/channel or a UL RS/channel, the terminal may perform unified Rx beam and Tx beam update with reference RSs for which update is indicated for all DL RSs/channels and UL RSs/channels to which the Rx/Tx beam reference RS referred to by the corresponding target RS/channel is referred together. Referring to Table 15 below, this embodiment will be described in detail.

In Table 12 above, when the base station updates TCI state ID 1, which was referred to for the Rx beam of CORESET 2 by option 3, to TCI state ID 6 (i.e., when the base station transmits a RRC/MAC message for updating the TCI state ID for CORESET 2 to the terminal, and TCI state ID 6 is indicated by the corresponding RRC/MAC message), as shown in Table 15 below, the terminal may perform the same update for all DL RS/channels and UL RSs/channels referring to TCI state ID 1 (for Rx beam and/or Tx beam). That is, through the Rx beam update of CORESET 2 (by single RRC/MAC level signaling), the Rx beam of activated TCI state 3 and CSI-RS resource 3 (for PDSCH) and the Tx beam of (CB usage) SRS resource 1 are updated identically (i.e., updated to TCI state ID 6).

In other words, when the TCI state ID (or spatial relation info ID) of the target DL channel/RS or the target UL channel/RS is updated from x to y by option 3, a TCI state ID (or spatial relation info ID) for all DL RSs/channels and UL RSs/channels where TCI state ID x is configured (or spatial relation info ID x is configured) may be updated to TCI state ID y (or spatial relation info ID y). Therefore, in the update of Rx/Tx beams of the terminal, an unified update of Rx/Tx beams is possible, thereby reducing overhead and latency.

Here, for example, option 3 may be applied based on the establishment of UL/DL beam correspondence.

Table 15 illustrates a Rx/Tx beam reference situation of a DL/UL RS/channel in a specific BWP after update (option 3).

TABLE 15

| | Target DL/UL RS/channel | (For Rx/Tx beam) Reference TCI state ID |
| --- | --- | --- |
| Downlink | CORESET 1 | TCI state ID 2 |
| | CORESET 2 | TCI state ID 6 |
| | CORESET 3 | TCI state ID 5 |
| | (For PDSCH) activated TCI state 1 | TCI state ID 2 |

TABLE 15-continued

| | Target DL/UL RS/channel | (For Rx/Tx beam) Reference TCI state ID |
| --- | --- | --- |
| | (For PDSCH) activated TCI state 2 | TCI ID 3 |
| | (For PDSCH) activated TCI state 3 | TCI state ID 6 |
| | (For PDSCH) activated TCI state 4 | TCI state ID 5 |
| | CSI-RS resource 1 | TCI state ID 2 |
| | CSI-RS resource 3 | TCI state ID 6 |
| Uplink | PUCCH resource 1 | TCI state ID 5 |
| | PUCCH resource 2 | TCI state ID 6 |
| | PUCCH resource 3 | TCI state ID 3 |
| | (CB usage) SRS resource 1 | TCI state ID 6 |
| | (CB usage) SRS resource 2 | TCI state ID 5 |
| | (antenna switching usage) SRS resource 13 | TCI state ID 3 |
| | (antenna switching usage) SRS resource 15 | TCI state ID 5 |

The above embodiment is just one example in the DL/UL unified TCI framework, and option 3 may be applied even when DL TCI-related operations and spatial relation-related operations are mixed. That is, even when a spatial relation info identifier (ID) is configured for the UL channel/RS, the above option 3 may be equally applied. As another example of Embodiment 1, options 1, 2, and 3 may be equally applied to a case in which a panel identifier (ID) is associated (associated) with a DL/UL unified TCI framework. That is, a panel ID associated with each DL/UL TCI state ID may be configured.

In this case, as in options 1, 2, and 3, when a Rx/Tx beam update is performed along with a panel ID update for a specific DL RS/channel or UL RS/channel, the terminal may perform an unified update of the same Rx/Tx beam and panel ID for all DL RS/channels or/and UL RS/channels referring to the corresponding TCI state ID.

Alternatively, when an update of an unified Rx/Tx beam and panel ID for specific target RS/channel(s) is performed by TCI state ID update by the base station, a switching operation or indication by the base station for whether the terminal updates using i) only beam information, ii) only panel information or iii) both beam information and panel information of corresponding TCI state ID in the target RS/channel(s) may be performed. For example, in the case of i), since only beam information is considered, Rx/Tx beam information for all DL channels/RSs or all UL channels/RSs or all DL/UL channels/RSs referring to the same TCI state ID (i.e., the same TCI state ID is configured) in the operations of above options 1 to 3 may be updated. In the case of ii), since only panel information is considered, a panel ID for all DL channels/RSs, all UL channels/RSs, or all DL/UL channel/RSs referring to the same TCI state ID (i.e., for which the same TCI state ID is configured) may be updated. In the case of iii), since both the TCI state ID and the panel ID are considered, Rx/Tx beam information and panel ID for all DL channels/RSs or all UL channels/RSs or all DL/UL channels referring the same TCI state ID (i.e., the same TCI state ID is configured) may be updated. The base station may configure which operation to be performed by the terminal among operations i, ii, and iii (i.e., the condition for performing the update operation) through higher layer signaling (e.g., RRC signaling, etc.).

Table 16 illustrates a DL/UL unified TCI framework to which panel ID is coupled/associated.

US 12,628,005 B2

37                                                           38

TABLE 16

| DL/UL TCI-state ID | Panel ID | Source (reference) RS | qcl-Type |
|---|---|---|---|
| 1 | 1 | SRS resource 5 (for BM) | Type D or spatial relation |
| 2 | 1 | SSB 3 | Type D or spatial relation |
| 3 | 2 | CSI-RS resource 2 | Type D or spatial relation |
| 4 | 2 | SRS resource 9 (for BM) | Type D or spatial relation |
| 5 | 1 | CSI-RS resource 12 | Type D or spatial relation |
| 6 | 1 | CSI-RS resource 4 | Type D or spatial relation |

The operation and detailed embodiments (options 1, 2, and 3 and other examples of embodiment 1) of the first embodiment may be supported by at least one of the following base station-to-device operations. Embodiment a) A group or list through higher layer signaling (e.g., RRC signaling) for target DL RS/channel(s) or/and target UL RS/channel(s) to perform Rx/Tx beam update may be configured. Rx beam or/and Tx beam update is possible for all target RS/channel(s) in the group or list through the update of the Rx/Tx beam of a specific target RS/channel existing in the corresponding group or list.

There may be a plurality of groups or lists, and it may be restricted that only a specific DL/UL RS/channel is configured for a specific group or list (e.g., a specific group is configured with only RS, and a specific group is configured with only DL RS/channel, a specific group is configured only SRS, etc.). Also, different groups or lists may refer to the same reference RS. That is, the same TCI state ID may be configured for different groups or lists. As in this proposal, when an unified reference RS update (or an unified TCI state ID update) is performed, depending on which group the target RS/channel to be updated belongs to, an unified update may be performed within each group (i.e., the group to which the target RS/channel to be updated belongs).

And/or embodiment b) When updating a Rx/Tx beam of a specific target DL/UL RS/channel as in the first embodiment, an unified update may be performed on DL or/and UL RS/channels that refer to a specific (Rx/Tx beam) reference RS together on a rule-based basis. For example, one or more groups (or lists) for DL RS/channel(s) or/and UL RS/channel (s) may be configured. And, when updating the Rx/Tx beam of the target DL/UL RS/channel (or updating the TCI state ID), a Rx/Tx beam (or TCI state ID) of UL/DL RS/channels referring to the same Rx/Tx beam (or UL/DL RS/channels with the same TCI state ID) as the target DL/UL RS/channel within the group to which the target DL/UL RS/channel belongs may be updated.

As in embodiment a) or/and embodiment b), the unified Rx/Tx beam update (i.e., TCI state ID update) may be performed by RRC and/or MAC CE signaling. The unified Rx/Tx beam update operation may be performed through MAC CE signaling as follows.

The unified RX/TX beam update operation may follow at least one of a method of utilizing an existing MAC CE format (Alt 1) and a method of newly establishing and utilizing a new MAC CE format (Alt 2).

Alt 1) A method of reusing a MAC CE format for updating existing TCI state or/and a MAC CE format for updating existing spatial relation info A MAC CE for updating the TCI state of DL RS/channel and a MAC CE for spatial relation update of UL RS/channel are as follows.

FIG. 16 is a diagram illustrating semi-persistent CSI-RS/CSI-IM resource set activation/deactivation MAC CE according to an embodiment of the present disclosure.

Referring to FIG. 16, a semi-persistent (SP) CSI-RS/CSI-IM resource set activation/deactivation MAC CE is identified by a MAC subheader having a logical channel identifier (LCID). In addition, the SP CSI-RS/CSI-IM resource set activation/deactivation MAC CE has a variable size with the following fields.

A/D: This field is a field indicating whether to activate or deactivate indicated SP CSI-RS and CSI-IM resource set(s). The field is set to 1 to indicate activation, otherwise it indicates deactivation;

Serving Cell ID: This field indicates the identity of the Serving Cell for which the MAC CE applies. The length of the field is 5 bits;

BWP ID: This field indicates a DL BWP for which the MAC CE applies as the codepoint of the DCI bandwidth part indicator field. The length of the BWP ID field is 2 bits;

SP CSI-RS resource set ID: This field contains an index of NZP-CSI-RS-ResourceSet containing Semi-Persistent NZP CSI-RS resources and indicates the Semi Persistent NZP CSI-RS resource set, which shall be activated or deactivated. The length of the field is 6 bits;

IM: This field indicates the presence of the octet (Oct) containing SP CSI-IM resource set ID field. If the IM field is set to 1, the octet containing SP CSI-IM resource set ID field is present. If IM field is set to 0, the octet containing SP CSI-IM resource set ID field is not present;

SP CSI-IM resource set ID: This field contains an index of CSI-IM-ResourceSet containing Semi Persistent CSI-IM resources and indicates the Semi Persistent CSI-IM resource set, which shall be activated or deactivated. The length of the field is 6 bits;

TCI State ID$_i$: This field contains higher layer parameter TCI-StateId for identifier for a TCI State, and the TCI state by the TCI-StateId is used as QCL source for the resource within the Semi Persistent NZP CSI-RS resource set indicated by SP CSI-RS resource set ID field. TCI State ID$_0$ indicates TCI State for the first resource within the set, TCI State ID$_i$ for the second one and so on. The length of the field is 7 bits. If the A/D field is set to 0, the octets containing TCI State ID field(s) are not present;

R: Reserved bit, set to 0.

FIG. 17 is a diagram illustrating TCI state activation/deactivation MAC CE for a UE specific PDSCH according to an embodiment of the present disclosure.

Referring to FIG. 17, a TCI state activation/deactivation MAC CE for a UE-specific PDSCH is identified by a MAC subheader having an LCID. In addition, the TCI state activation/deactivation MAC CE for the UE-specific PDSCH has a variable size with the following fields.

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2, this MAC CE applies to all the Serving Cells configured in the set simultaneousTCI-UpdateList1 or simultaneousTCI-UpdateList2, respectively;

BWP ID: This field indicates a DL BWP for which the MAC CE applies as the codepoint of the DCI bandwidth part indicator field. The length of the BWP ID field is 2 bits. This field is ignored if this MAC CE applies to a set of Serving Cells;

$T_i$: If there is a TCI state with TCI-StateId i, this field indicates the activation/deactivation status of the TCI state with TCI-StateId i, otherwise MAC entity shall ignore the $T_i$ field. The $T_i$ field is set to 1 to indicate that the TCI state with TCI-StateId i is activated and mapped to the codepoint of the DCI Transmission Configuration Indication field. The $T_i$ field is set to 0 to indicate that the TCI state with TCI-StateId i is deactivated and is not mapped to the codepoint of the DCI Transmission Configuration Indication field. The code-point to which the TCI State is mapped is determined by its ordinal position among all the TCI States with $T_i$ field set to 1, i.e. the first TCI State with $T_i$ field set to 1 is mapped to the codepoint value 0, second TCI State with $T_i$ field set to 1 shall be mapped to the codepoint value 1 and so on. The maximum number of activated TCI states is 8.

CORESET Pool ID: This field indicates that mapping between the activated TCI states and the codepoint of the DCI Transmission Configuration Indication set by field $T_i$ is specific to the ControlResourceSetId configured with CORESET Pool ID. This field set to 1 indicates that this MAC CE is applied for the DL transmission scheduled by CORESET with the CORESET pool ID equal to 1, other-wise, this MAC CE is applied for the DL transmission scheduled by CORESET pool ID equal to 0. If the coreset-PoolIndex is not configured for any CORESET, MAC entity shall ignore the CORESET Pool ID field in this MAC CE when receiving the MAC CE. If the Serving Cell in the MAC CE is configured in a cell list that contains more than one Serving Cell, the CORSET Pool ID field is ignored when receiving the MAC CE.

Figure 18:
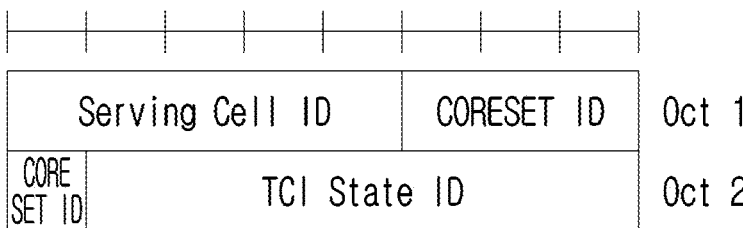
FIG. 18 illustrates a TCI state indication MAC CE for a UE-specific PDCCH according to an embodiment of the present disclosure.

FIG. 18 illustrates a TCI state indication MAC CE for a UE specific PDCCH according to an embodiment of the present disclosure.

Referring to FIG. 18, a TCI state indicating MAC CE for a UE-specific PDCCH is identified by a MAC subheader having an LCID. In addition, the TCI state indication MAC CE for the UE-specific PDCCH has a fixed size of 16 bits with the following fields.

Serving Cell ID: This field indicates the identity of the Serving Cell for which the MAC CE applies. The length of the field is 5 bits. If the indicated Serving Cell is configured as part of a simultaneousTCI-UpdateList1 or simultane-ousTCI-UpdateList2, this MAC CE applies to all theServing Cells in the set simultaneousTCI-UpdateList1 or simultane-ousTCI-UpdateList2, respectively;

CORESET ID: This field indicates a Control Resource Set identified with ControlResourceSetId, for which the TCI State is being indicated. In case the value of the field is 0, the field refers to the Control Resource Set configured by controlResourceSetZero. The length of the field is 4 bits;

TCI State ID: This field indicates the TCI state identified by TCI-StateId applicable to the Control Resource Set identified by CORESET ID field. If the field of CORESET ID is set to 0, this field indicates a TCI-StateId for a TCI state of the first 64 TCI-states configured by tci-StatesToAdd-ModList and tci-StatesToReleaseList in the PDSCH-Config in the active BWP. If the field of CORESET ID is set to the other value than 0, this field indicates a TCI-StateId con-figured by tci-StatesPDCCH-ToAddList and tci-StatesPDCCH-ToReleaseList in the controlResourceSet identified by the indicated CORESET ID. The length of the field is 7 bits.

FIG. 19 illustrates semi-persistent SRS activation/deacti-vation MAC CE according to one embodiment of the present disclosure.

Referring to FIG. 19, a semi persistent (SP) SRS activa-tion/deactivation MAC CE is identified by a MAC sub-header having an LCID. In addition, the SP SRS activation/ deactivation MAC CE has a variable size with the following fields.

A/D: This field indicates whether to activate or deactivate indicated SP SRS resource set. The field is set to 1 to indicate activation, otherwise it indicates deactivation;

SRS Resource Set's Cell ID: This field indicates the identity of the Serving Cell, which contains activated/ deactivated SP SRS Resource Set. If the C field is set to 0, this field also indicates the identity of the Serving Cell which contains all resources indicated by the Resource $ID_i$ fields. The length of the field is 5 bits;

SRS Resource Set's BWP ID: This field indicates a UL BWP as the codepoint of the DCI bandwidth part indicator field, which contains activated/deactivated SP SRS Resource Set. If the C field is set to 0, this field also indicates the identity of the BWP which contains all resources indicated by the Resource $ID_i$ fields. The length of the field is 2 bits;

C: This field indicates whether the octets containing Resource Serving Cell ID field(s) and Resource BWP ID field(s) are present. If this field is set to 1, the octets containing Resource Serving Cell ID field(s) and Resource BWP ID field(s) are present, otherwise they are not present;

SUL: This field indicates whether the MAC CE applies to the normal UL (NUL) carrier or supplementary UL (SUL) carrier configuration. This field is set to 1 to indicate that it applies to the SUL carrier configuration, and it is set to 0 to indicate that it applies to the NUL carrier configuration;

SP SRS Resource Set ID: This field indicates the SP SRS Resource Set ID identified by SRS-ResourceSetId, which is to be activated or deactivated. The length of the field is 4 bits;

$F_i$: This field indicates the type of a resource used as a spatial relationship for SRS resource within SP SRS Resource Set indicated with SP SRS Resource Set ID field. $F_0$ refers to the first SRS resource within the resource set, $F_1$ to the second one and so on. The field is set to 1 to indicate NZP CSI-RS resource index is used, and it is set to 0 to indicate either SSB index or SRS resource index is used. The length of the field is 1 bit. This field is only present if MAC CE is used for activation (i.e. the A/D field is set to 1);

Resource $ID_i$: This field contains an identifier of the resource used for spatial relationship derivation for SRS resource i. Resource $ID_0$ refers to the first SRS resource within the resource set, Resource $ID_1$ to the second one and so on. If $F_i$ is set to 0, and the first bit of this field is set to 1, the remainder of this field contains SSB-Index. If $F_i$ is set to 0, and the first bit of this field is set to 0, the remainder of this field contains SRS-ResourceId. The length of the field is 7 bits. This field is only present if MAC CE is used for activation (i.e. the A/D field is set to 1);

Resource Serving Cell $ID_i$: This field indicates the iden-tity of the Serving Cell on which the resource used for spatial relationship derivation for SRS resource i is located. The length of the field is 5 bits;

Resource BWP $ID_i$: This field indicates a UL BWP as the codepoint of the DCI bandwidth part indicator field, on which the resource used for spatial relationship derivation for SRS resource i is located. The length of the field is 2 bits;

R: Reserved bit, set to 0.

Figure 20:
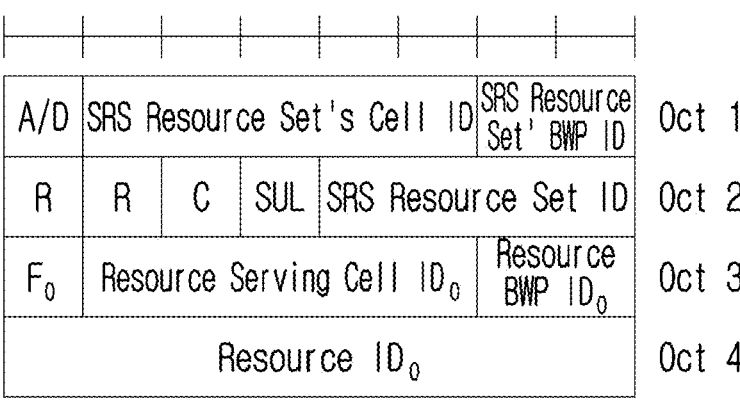
FIG. 20 illustrates a semi-persistent/aperiodic SRS spatial relation indication MAC CE according to an embodiment of the present disclosure.

FIG. 20 illustrates a semi-persistent/aperiodic SRS spatial relation indication MAC CE according to an embodiment of the present disclosure.

Referring to FIG. 20, a semi persistent (SP)/aperiodic (AP) SRS spatial relationship indication MAC CE is identified by a MAC subheader having an LCID. In addition, the SP/AP SRS spatial relationship indication MAC CE has a variable size with the following fields.

A/D: This field indicates whether to activate or deactivate indicated SP SRS resource set. The field is set to 1 to indicate activation, otherwise it indicates deactivation. If the indicated SRS resource set ID is for the AP SRS resource set, MAC entity ignores this field;

SRS Resource Set's Cell ID: This field indicates the identity of the Serving Cell, which contains the indicated SP/AP SRS Resource Set. If the C field is set to 0, this field also indicates the identity of the Serving Cell which contains all resources indicated by the Resource $ID_i$ fields. The length of the field is 5 bits;

SRS Resource Set's BWP ID: This field indicates a UL BWP as the codepoint of the DCI bandwidth part indicator field, which contains the indicated SP/AP SRS Resource Set. If the C field is set to 0, this field also indicates the identity of the BWP which contains all resources indicated by the Resource $ID_i$ fields. The length of the field is 2 bits;

C: This field indicates whether the octets containing Resource Serving Cell ID field(s) and Resource BWP ID field(s) are present. If this field is set to 1, the octet containing the Resource Serving Cell ID field(s) and the Resource BWP ID field(s) is present, otherwise not present;

SUL: This field indicates whether the MAC CE applies to the normal UL (NUL) carrier or supplementary UL (SUL) carrier configuration. This field is set to 1 to indicate that it applies to the SUL carrier configuration, and it is set to 0 to indicate that it applies to the NUL carrier configuration;

SRS Resource Set ID: This field indicates the SP/AP SRS Resource Set ID identified by SRS-ResourceSetId. The length of the field is 4 bits;

$F_i$: This field indicates the type of a resource used as a spatial relationship for SRS resource within SP/AP SRS Resource Set indicated with SP/AP SRS Resource Set ID field. $F_0$ refers to the first SRS resource within the resource set, $F_1$ to the second one and so on. The field is set to 1 to indicate NZP CSI-RS resource index is used, and it is set to 0 to indicate either SSB index or SRS resource index is used. The length of the field is 1 bit. This field is only present if MAC CE is used for activation of SP SRS resource set (i.e. the A/D field is set to 1), or for AP SRS resource set;

Resource Serving Cell $ID_i$: This field indicates the identity of the Serving Cell on which the resource used for spatial relationship derivation for SRS resource i is located. The length of the field is 5 bits;

Resource BWP $ID_i$: This field indicates a UL BWP as the codepoint of the DCI bandwidth part indicator field, on which the resource used for spatial relationship derivation for SRS resource i is located. The length of the field is 2 bits;

Resource $ID_i$: This field contains an identifier of the resource used for spatial relationship derivation for SRS resource i. Resource $ID_0$ refers to the first SRS resource within the resource set, Resource $ID_1$ to the second one and so on. If $F_i$ is set to 0, the first bit of this field is always set to 0. If $F_i$ is set to 0, and the second bit of this field is set to 1, the remainder of this field contains SSB-Index. If $F_i$ is set to 0, and the second bit of this field is set to 0, the remainder of this field contains SRS-ResourceId. The length of the field is 8 bits. This field is only present if MAC CE is used for activation of SP SRS resource set (i.e. the A/D field is set to 1), or for AP SRS resource set;

R: Reserved bit, set to 0.

FIG. 21 is a diagram illustrating a PUCCH spatial relation activation/deactivation MAC CE in a wireless communication system to which the present disclosure may be applied.

Referring to FIG. 21, a PUCCH spatial relation Activation/Deactivation MAC CE is identified by a MAC subheader having an LCID. In addition, the PUCCH spatial relation Activation/Deactivation MAC CE has a fixed size of 24 bits with the following fields.

Serving Cell ID: This field indicates the identity of the Serving Cell for which the MAC CE applies. The length of the field is 5 bits;

BWP ID: This field indicates a UL BWP for which the corresponding MAC CE applies as the codepoint of the DCI bandwidth part indicator field. The length of the BWP ID field is 2 bits;

PUCCH Resource ID: This field contains an identifier of the PUCCH resource ID identified by PUCCH-ResourceId. The length of the field is 7 bits;

$S_i$: If, in PUCCH-Config in which the PUCCH Resource ID is configured, there is a PUCCH Spatial Relation Info with PUCCH-SpatialRelationInfoId, configured for the uplink bandwidth part indicated by BWP ID field, $S_i$ indicates the activation status of PUCCH Spatial Relation Info with PUCCH-SpatialRelationInfoId equal to i+1, otherwise MAC entity shall ignore this field. The $S_i$ field is set to 1 to indicate PUCCH Spatial Relation Info with PUCCH-SpatialRelationInfoId equal to i+1 shall be activated. The $S_i$ field is set to 0 to indicate PUCCH Spatial Relation Info with PUCCH-SpatialRelationInfoId equal to i+1 shall be deactivated. Only a single PUCCH Spatial Relation Info may be active for a PUCCH Resource at a time;

R: Reserved bit, set to 0.

FIG. 22 is a diagram illustrating an enhanced PUCCH spatial relation active/inactive MAC CE in a wireless communication system to which the present disclosure may be applied.

Referring to FIG. 22, an enhanced PUCCH spatial relation activation/deactivation MAC CE (Enhanced PUCCH Spatial Relation Activation/Deactivation MAC CE) is identified by a MAC subheader having an enhanced LCID (eLCID). In addition, the Enhanced PUCCH Spatial Relation Activation/Deactivation MAC CE has a variable size with the following fields.

Serving Cell ID: This field indicates the identity of the Serving Cell for which the MAC CE applies. The length of the field is 5 bits;

BWP ID: This field indicates a UL BWP for which the MAC CE applies as the codepoint of the DCI bandwidth part indicator field. The length of the BWP ID field is 2 bits;

PUCCH Resource ID: This field contains an identifier of the PUCCH resource ID identified by PUCCH-ResourceId, which is to be activated with a spatial relation indicated by Spatial Relation Info ID field in the subsequent octet. The length of the field is 7 bits. If the indicated PUCCH Resource ID is configured as a part of a PUCCH Resource Group, no other PUCCH Resources within the same PUCCH Resource group are indicated in the MAC CE, and this MAC CE applies to all the PUCCH Resources in the PUCCH Resource group;

Spatial Relation Info ID: This field contains PUCCH-SpatialRelationInfoId-1 where PUCCH-SpatialRelationInfoId is the identifier of the PUCCH Spatial Relation Info in PUCCH-Config in which the PUCCH Resource ID is configured. The length of the field is 6 bits;

R: Reserved bit, set to 0.

As described above, an existing MAC CE for the above Rx/Tx beam update (or TCI state ID update or spatial relation Info ID update) may be used. Here, when the Rx/Tx beam of a specific target DL/UL RS/channel is updated (or TCI state ID update or spatial relation Info ID update), when the specific target DL/UL RS/channel belongs to the group or list, the same Rx/Tx beam update (or TCI state ID update or spatial relation Info ID update) by the MAC CE may be performed for all RS/channels belonging to a corresponding group or list.

And/or, as in the above embodiment 1, when the Rx/Tx beam is updated (or TCI state ID update or spatial relation Info ID update) by utilizing the existing MAC CE of a specific target DL/UL RS/channel, an unified update may be performed on DL or/and UL RS/channels that refer to a specific (Rx/Tx beam) reference RS together on a rule-based basis (Alternatively, an unified update may be performed for DL or/and UL RS/channels in which the same TCI state ID or the same spatial relation Info ID is configured).

Alt 2) Method of utilizing MAC CE format for new Rx/Tx beam update

As in Alt 1, when a specific group or list is configured by RRC configuration for target DL/UL RS/channel(s), a MAC CE format for updating the Rx/Tx beam (or updating the TCI state ID or updating the spatial relation Info ID) of the corresponding group or list may be newly configured/defined. Here, unified Rx/Tx beam update (or TCI state ID update or spatial relation Info ID update) for a specific group or list may be performed (through a bitmap indication of the corresponding MAC CE message). The MAC CE for updating the Rx/Tx beam of the specific group or list includesmay consist of at least one of a target serving cell ID, a target BWP ID, a target group ID, a target list ID (or target RS/channel ID), or source (reference) RS ID.

If the new MAC CE format includes the target RS/channel ID (by the DL/UL integrated TCI framework), an unified update may be performed on DL or/and UL RS/channels that refer to a specific (Rx/Tx beam) reference RS together on a rule-based basis (Alternatively, an unified update may be performed for DL or/and UL RS/channels in which the same TCI state ID or the same spatial relation Info ID is configured).

In the above-described a), b), Alts 1 and 2, a specific group or list may include only DL RS/channel or only UL RS/channel.

In addition, the operation and detailed embodiments of the above-described embodiment 1 (options 1, 2, 3, other examples of embodiment 1 and embodiment a), embodiment b), and Alts 1 and 2) are applicable not only to single BWP, but also to multiple CC/BWP.

Hereinafter, simultaneous TCI state update and/or simultaneous spatial relation update for multi-component carrier (CC)/bandwidth part (BWP) will be described.

For latency/overhead reduction across multiple CCs/BWPs, a single MAC-CE is supported to activate at least the same set of PDSCH TCI state IDs for multiple CCs/BWPs.

Example 1: Rel-15 MAC-CE is reused to activate same set of TCI state IDs for all active BWPs in same band or cell group(s) on FR2.

Here, Support of this mode may be indicated by UE capability. To operate in this mode, UE may expect the same QCL-TypeD RS is configured for same TCI state ID for all BWPs in each band or cell group(s). For activation MAC-CE received on any active BWP in a band or cell group(s), indicated activated TCI state IDs will be applied to every active BWP in that band or cell group(s).

Example 2: Reuse Rel-15 MAC-CE to activate one set of TCI state IDs (including both QCL Type-A and Type-D RSs) for an active BWP of the CC indicated by the MAC-CE to be applied to all active BWPs in same band or cell group(s) on FR2

Here, The QCL Type A RS(s) applied to each CC/BWP is that corresponding to the same resource ID(s) indicated by the TCI state IDs. QCL type-A is provided from the BWP where the TCI state is applied For the feature of single MAC-CE to activate at least the same set of PDSCH TCI state IDs for multiple CCs/BWPs, in the RRC perspective, the candidate (up to 128) TCI-states are still independently configurable by RRC for each CC/BWP.

When a set of TCI-state IDs for PDSCH are activated by a MAC CE for a set of CCs/BWPs at least for the same band, where the applicable list of CCs is indicated by RRC signalling, the same set of TCI-state IDs are applied for the all BWPs in the indicated CCs.

When a TCI-state ID is activated for a CORESET by a MAC CE for a set of CCs/BWPs at least for the same band, where the applicable list of CCs is indicated by RRC signalling, the TCI-state ID is applied for the CORESET(s) with the same CORESET ID for all the BWPs in the indicated CCs.

For the purpose of simultaneous TCI state activation across multiple CCs/BWPs, up to 2 lists of CCs may be configured by RRC per UE, and the applied list is determined by the indicated CC in the MAC CE. Here, the UE expect no overlapped CC in multiple RRC-configured lists of CCs.

When a Spatial Relation Info is activated for a SP/AP SRS resource by a MAC CE for a set of CCs/BWPs at least for the same band, where the applicable list of CCs is indicated by RRC signalling, the Spatial Relation Info is applied for the SP/AP SRS resource(s) with the same SRS resource ID for all the BWPs in the indicated CCs.

For supporting simultaneous spatial relation update across multiple CCs/BWPs by MAC CE, it is not restricted to the case where the usage for the SRS should be the same.

For simultaneous Spatial Relation update across multiple CCs/BWPs, up to 2 lists of CCs may be configured by RRC per UE, and the applied list is determined by the indicated CC in the MAC CE. Here, the UE expect no overlapped CC in multiple RRC-configured lists of CCs. The lists are independent from those for simultaneous TCI state activation.

When TCI state ID is activated simultaneously for PDSCH via MAC CE, the same set of TCI state IDs is applied for the all BWPs in the configured CCs, and inter-band CA is not restricted from the signaling perspective. Depending on the TCI state configuration across different CCs (configured via RRC), the set of TCI state IDs may not refer to the same set of TCI states for different CCs.

When TCI state ID is activated simultaneously for CORE-SET via MAC CE, the same TCI state ID is applied for the all BWPs in the configured CCs, and inter-band CA is not restricted from the signaling perspective. Depending on the TCI state configuration across different CCs (configured via RRC), the TCI state ID may not refer to the same TCI state for different CCs.

When the same spatial relationship is updated for SP/AP-SRS resources via MAC CE, the same spatial relation is applied for the all BWPs in the configured CCs, and inter-band CA is not restricted from the signaling perspective.

As above, simultaneous TCI state update and simultaneous spatial relation update are introduced for a set of CCs/BWPs in Rel-16 NR MIMO. Similarly, the operation and detailed embodiments of Embodiment 1 (options 1, 2, 3, other examples of Embodiment 1 and Embodiment a), Embodiment b), and Alts 1 and 2) may be unitedly performed for a set of CCs/BWPs.

In addition, the above-described operations may be equally applied when updating a Rx/Tx beam of a UE-specific DL/UL RS/channel through DCI.

Figure 23:
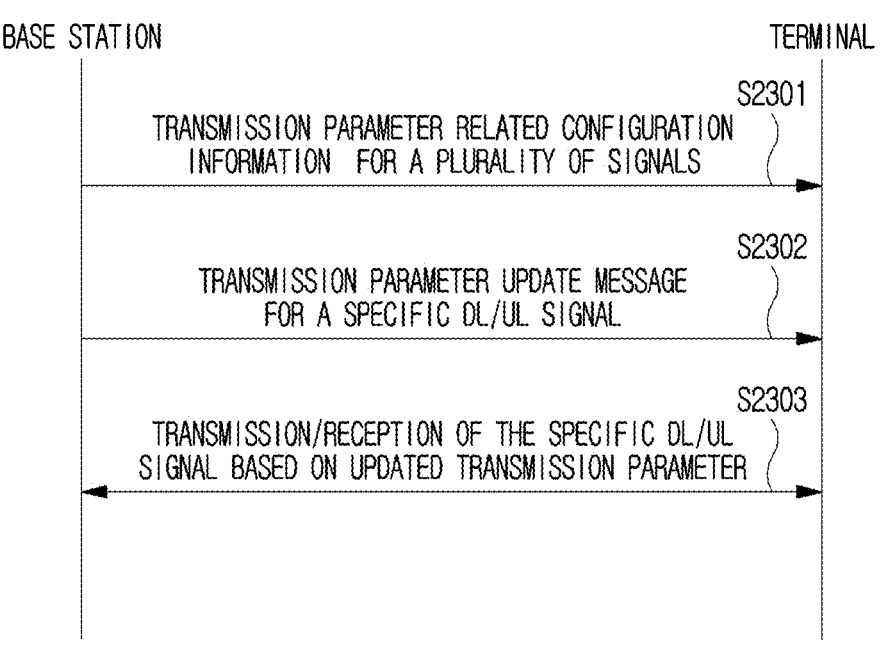
FIG. 23 is a diagram illustrating a signaling procedure between a base station and a terminal for a method for transmitting and receiving an uplink/downlink signal according to an embodiment of the present disclosure.

FIG. 23 is a diagram illustrating a signaling procedure between a base station and a terminal for a method for transmitting and receiving an uplink/downlink signal according to an embodiment of the present disclosure.

In FIG. 23, a signaling procedure between a terminal and a base station based on the operation and detailed embodiments (options 1, 2, and 3, other examples of embodiment 1 and embodiment a), embodiment b), and Alts 1 and 2) of the previously proposed embodiment 1 is exemplified. The example of FIG. 23 is for convenience of description, and does not limit the scope of the present disclosure. Some step(s) illustrated in FIG. 23 may be omitted depending on circumstances and/or configuration. In addition, the base station and the terminal in FIG. 23 is only one example, and may be implemented as the apparatus illustrated in FIG. 28 below. For example, the processor 102/202 of FIG. 28 may control to transmit and receive channel/signal/data/information (e.g., RRC signaling, MAC CE, DCI for UL/DL scheduling, SRS, PDCCH, PDSCH, PUSCH, PUCCH, etc.) using the transceiver 106/206, and may control to store channel/signal/data/information to be transmitted or received in the memory 104/204.

Referring to FIG. 23, a base station (BS) may transmit transmission parameter-related configuration information for a plurality of signals to a user equipment (UE) (S2301). That is, the UE may receive transmission parameter-related configuration information for a plurality of signals from the base station.

Here, the plurality of signals may mean a plurality of downlink signals (e.g., PDSCH (or DMRS of PDSCH), PDCCH (or DMRS of PDCCH), CSI-RS, etc.), or a plurality of uplink signals (e.g., PUSCH (or DMRS of PUSCH), PUCCH (or DMRS of PUCCH), SRS, etc.), or may mean a plurality of downlink and uplink signals.

As described above, transmission parameters for a plurality of signals may mean configuration information related to a Rx beam of a terminal for downlink signals and/or a Tx beam of a terminal for uplink signals.

Specifically, as described above, the transmission parameter for a plurality of signals may mean a TCI state (e.g., QCL type for source (reference) RS, source (reference) RS resource) for each of the plurality of signals. In this case, each of the TCI states may be identified by a TCI state identifier.

Alternatively, transmission parameters for a plurality of signals may mean a reference RS of QCL type-D, particularly within a TCI state. In this case, QCL type D reference RSs may be identified by QCL type D reference RS resources.

Alternatively, transmission parameters for a plurality of signals may mean spatial relation information (e.g., spatial domain Tx filter/coefficient) for each of a plurality of signals, particularly for uplink signals. In this case, each of spatial relation information may be identified by a spatial relation info identifier. In this case, the TCI state identifier for downlink signals and the spatial relation info identifier for uplink signals may have the same meaning (same form).

In addition, configuration information related to transmission parameters for a plurality of signals may include a panel identifier associated with transmission parameters for the plurality of signals. That is, transmission parameters for a plurality of signals may be associated with panel identifiers. In this case, updating transmission parameters may include updating panel identifiers.

In addition, transmission parameter related configuration information for a plurality of signals may include group information (or list information) for the plurality of signals (e.g., Identifier information of a group (or list) to which each of a plurality of signals belongs). The group (or list) of the plurality of signals may be restricted to be grouped only with specific signals. For example, when grouping the plurality of signals, a specific group (or list) may consist of only uplink signals or only downlink signals. Alternatively, a specific group (or list) may consist of only reference signals or only channels.

In addition, through transmission parameter related configuration information for a plurality of signals or separate higher layer signaling, whether transmission parameters for one or more signals including the specific downlink signal are all identically updated by the transmission parameter update message may be configured.

Transmission parameter related configuration information for a plurality of signals may be transmitted through higher layer signaling (e.g., RRC signaling).

The base station (BS) transmits to the terminal (UE) an update message for updating a transmission parameter for a specific downlink signal or a specific uplink signal among a plurality of signals configured for the terminal (S2302). That is, the UE may receive a transmission parameter update message for a specific downlink signal or a specific uplink signal from the base station.

As described above, the transmission parameter update message may include information for updating/changing transmission parameters for a specific downlink signal or a specific uplink signal. In other words, the transmission parameter update message may include information for updating/changing a Tx beam for a specific downlink signal or a Rx beam for a specific uplink signal.

Specifically, the transmission parameter update message may include information for updating/changing a TCI state identifier for a specific downlink signal or a specific uplink signal.

Alternatively, the transmission parameter update message may include information for updating/changing the reference RS resource of QCL Type-D within the TCI state.

Alternatively, for an uplink signal, the transmission parameter update message may include information for updating/changing a spatial relation info identifier.

Here, the transmission parameter update message may be transmitted based on the MCE CE format for updating the TCI state and/or the MAC CE format for updating spatial relation info according to FIGS. 16 to 22.

Alternatively, the transmission parameter update message may be transmitted based on a newly defined MAC CE format for updating the TCI state (The corresponding MAC CE includes at least one of a target serving cell ID, a target BWP ID, a target group ID, a target list ID (or target RS/channel ID), and/or source (reference) RS ID).

The base station (BS) transmits a specific downlink signal to the terminal (UE) based on updated transmission parameters to the terminal or receives a specific uplink signal based on updated transmission parameters from the terminal (S2303). That is, the UE may receive a specific downlink signal based on updated transmission parameters from the base station or transmit a specific uplink signal to the base station based on updated transmission parameters.

Here, in addition to a specific downlink signal or uplink signal, transmission parameters for one or more signals among a plurality of signals (i.e., downlink signals and/or uplink signals) may also be identically updated by the transmission parameter update message. That is, when the transmission parameter of a specific downlink signal or uplink signal is updated from the first transmission parameter to the second transmission parameter, one or more signals for which the first transmission parameter has been configured may also be unitedly updated with the second transmission parameter.

Specifically, as described transmission above, parameters for the one or more signals may be updated based on at least one of option 1 to option 3 of the Embodiment 1.

According to option 1, for example, based on the update target being a specific downlink signal, when the TCI state of a specific downlink signal is updated from the first TCI state identifier to the second TCI state identifier, a TCI state of one or more downlink signals for which the first TCI state identifier identical to those of the specific downlink signal has been set may also be identically updated to the second TCI state identifier. As another example, when the reference RS of a specific downlink signal is updated from the first RS to the second RS, the reference RS of one or more downlink signals that referred to the first RS may also be updated to refer to the second RS.

In addition, according to option 2, for example, based on the update target being a specific uplink signal, when the TCI state of a specific uplink signal is updated from the first TCI state identifier to the second TCI state identifier, a TCI state of one or more uplink signals for which the first TCI state identifier identical to those of the specific uplink signal has been set may also be identically updated to the second TCI state identifier. For another example, when spatial relation info of a specific uplink signal is updated from the first spatial relation info identifier to the second spatial relation info identifier, spatial relation info of one or more uplink signals for which the first spatial relation info identifier identical to those of the specific uplink signal has been set may also be identically updated to the second spatial relation info identifier. As another example, when the reference RS of a specific uplink signal is updated from the first RS to the second RS, the reference RS of one or more uplink signals that referred to the first RS may also be updated to refer to the second RS.

In addition, according to option 3, for example, regardless of the update target being a specific downlink signal or a specific uplink signal, when the TCI state of a specific signal is updated from the first TCI state identifier to the second TCI state identifier by the update message, a TCI state of one or more downlink signals and uplink signals for which the first TCI state identifier identical to those of the specific signal has been set may also be identically updated to the second TCI state identifier. As another example, when the reference RS of a specific signal is updated from the first RS to the second RS, the reference RS of one or more downlink signals and uplink signals that referred to the first RS may also be updated to refer to the second RS.

Alternatively, according to the above embodiment a, the update may be performed based on a group (or list) including a plurality of signals. In other words, transmission parameters for one or more signals in a group to which a specific downlink signal or a specific uplink signal belongs among the plurality of signals may be identically updated by the update message. That is, when the TCI state of a specific signal is updated from the first TCI state identifier to the second TCI state identifier by the update message, a TCI state of one or more downlink signals and uplink signals belonging to the same group (or list) to which the specific signal belongs may also be identically updated to the second TCI state identifier. As another example, when the reference RS of a specific signal is updated from the first RS to the second RS, the reference RS of one or more downlink signals and uplink signals belonging to the same group (or list) to which the specific signal belongs may also be updated to refer to the second RS.

Alternatively, according to the embodiment b, the update may be performed according to at least one of option 1 to option 3 of the embodiment 1 based on a group (or list) including a plurality of signals. In other words, transmission parameters of one or more signals, for which a transmission parameter identical to those of the specific downlink signal or the specific uplink signal is configured, among signals within a group to which the specific downlink signal or the specific uplink signal belongs, among the plurality of signals, may be identically updated by the update message. Except for the limitation on signals in a group to which a specific downlink signal or a specific uplink signal belongs, the methods described in options 1 to 3 described above may be applied in the same manner.

Additionally, transmission parameters for a plurality of signals may be associated with panel identifiers. In this case, updating the transmission parameter for the specific signal may include updating the panel identifier, and the panel identifier of one or more downlink signals and/or uplink signals may also be updated in the same manner.

In addition, the update of the transmission parameter for the specific signal may be related to a plurality of CCs/BWPs (e.g., a set of CCs/BWPs). That is, an update for a plurality of CCs and/or a plurality of BWPs may be simultaneously applied by the transmission parameter update message. Here, the frequency domain (i.e., CC/BWP) in which the one or more signals are configured may be i) the same frequency domain as the frequency domain (i.e., CC/BWP) in which the specific downlink signal or the specific uplink signal is configured, or ii) may include the different frequency domain as the frequency domain (i.e., CC/BWP) in which the specific downlink signal or the specific uplink signal is configured.

Figure 24:
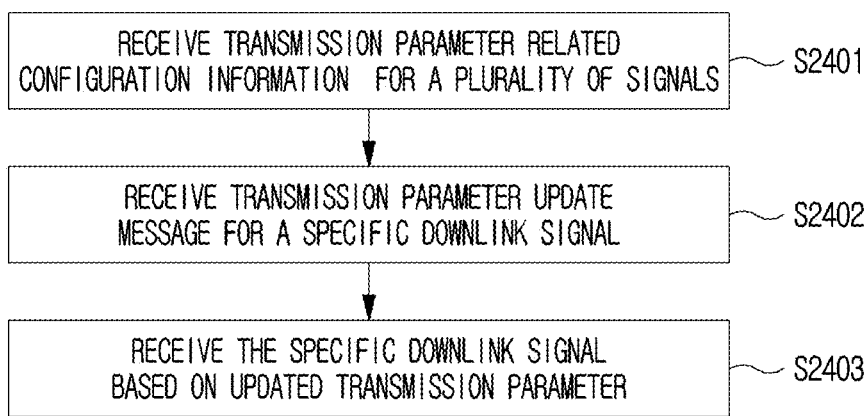
FIG. 24 is a diagram illustrating an operation of a terminal for transmitting and receiving a downlink signal according to an embodiment of the present disclosure.

FIG. 24 is a diagram illustrating an operation of a terminal for transmitting and receiving a downlink signal according to an embodiment of the present disclosure.

In FIG. 24, an operation of a terminal based on the operation and detailed embodiments (options 1, 2, and 3, other examples of embodiment 1 and embodiment a), embodiment b), and Alts 1 and 2) of the previously proposed embodiment 1 is exemplified. The example of FIG. 24 is for convenience of description, and does not limit the scope of the present disclosure. Some step(s) illustrated in FIG. 24 may be omitted depending on circumstances and/or configuration. In addition, the terminal in FIG. 24 is only one example, and may be implemented as the apparatus illustrated in FIG. 28 below. For example, the processor 102/202 of FIG. 28 may control to transmit and receive channel/signal/data/information (e.g., RRC signaling, MAC CE, DCI for UL/DL scheduling, SRS, PDCCH, PDSCH, PUSCH, PUCCH, etc.) using the transceiver 106/206, and may control to store channel/signal/data/information to be transmitted or received in the memory 104/204.

Figure 28:
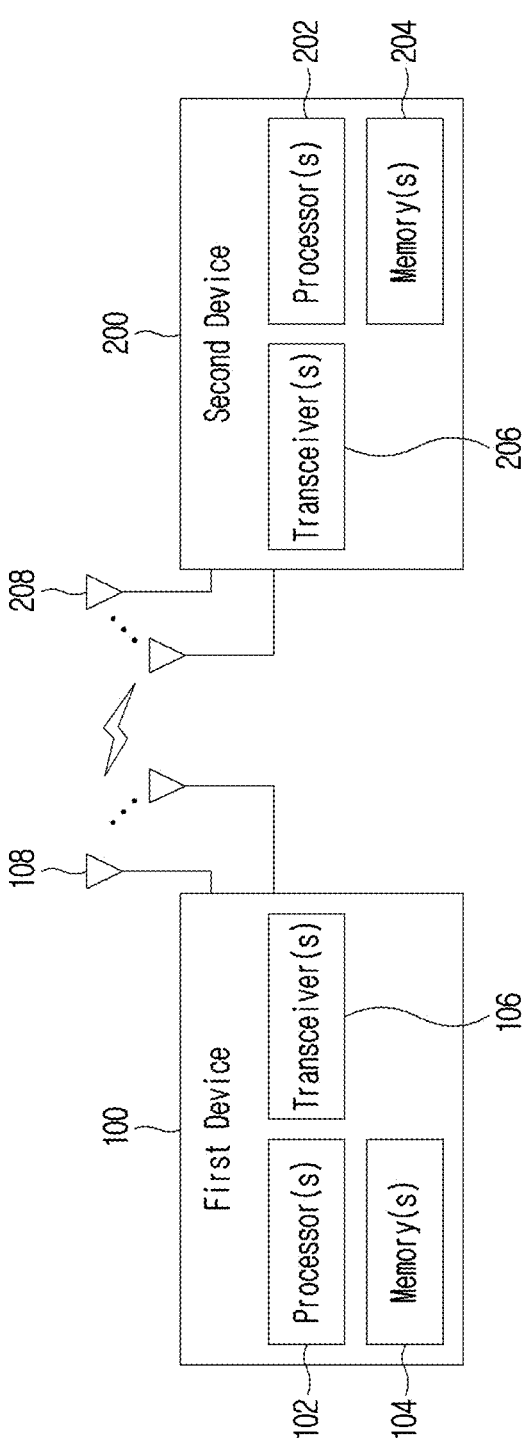
FIG. 28 illustrates a block diagram of a wireless communication device according to an embodiment of the present disclosure.

Also, the operation of FIG. 24 may be processed by one or more processors (102, 202) in FIG. 28, and the operation of FIG. 24 may be stored in a memory (e.g., one or more memories (104, 204) in FIG. 28, in the form of instructions/programs (e.g., instructions, executable code) for driving at least one processor (102, 202) in FIG. 28.

Referring to FIG. 24, a terminal receives transmission parameter-related configuration information for a plurality of signals from a base station (S2401).

Here, the plurality of signals may mean a plurality of downlink signals (e.g., PDSCH (or DMRS of PDSCH), PDCCH (or DMRS of PDCCH), CSI-RS, etc.), or a plurality of uplink signals (e.g., PUSCH (or DMRS of PUSCH), PUCCH (or DMRS of PUCCH), SRS, etc.), or may mean a plurality of downlink and uplink signals.

In addition, as described above, transmission parameters for a plurality of signals may mean configuration information related to a Rx beam of a terminal for downlink signals and/or a Tx beam of a terminal for uplink signals.

Specifically, as described above, the transmission parameter for a plurality of signals may mean a TCI state (e.g., QCL type for source (reference) RS, source (reference) RS resource) for each of the plurality of signals. In this case, each of the TCI states may be identified by a TCI state identifier.

Alternatively, transmission parameters for a plurality of signals may mean a reference RS of QCL type-D, particularly within a TCI state. In this case, QCL type D reference RSs may be identified by QCL type D reference RS resources.

Alternatively, transmission parameters for a plurality of signals may mean spatial relation information (e.g., spatial domain Tx filter/coefficient) for each of a plurality of signals, particularly for uplink signals. In this case, each of spatial relation information may be identified by a spatial relation info identifier. In this case, the TCI state identifier for downlink signals and the spatial relation info identifier for uplink signals may have the same meaning (same form).

In addition, configuration information related to transmission parameters for a plurality of signals may include a panel identifier associated with transmission parameters for the plurality of signals. That is, transmission parameters for a plurality of signals may be associated with panel identifiers. In this case, updating transmission parameters may include updating panel identifiers.

In addition, transmission parameter related configuration information for a plurality of signals may include group information (or list information) for the plurality of signals (e.g., Identifier information of a group (or list) to which each of a plurality of signals belongs). The group (or list) of the plurality of signals may be restricted to be grouped only with specific signals. For example, when grouping the plurality of signals, a specific group (or list) may consist of only uplink signals or only downlink signals. Alternatively, a specific group (or list) may consist of only reference signals or only channels.

In addition, through transmission parameter related configuration information for a plurality of signals or separate higher layer signaling, whether transmission parameters for one or more signals including the specific downlink signal are all identically updated by the transmission parameter update message may be configured.

Transmission parameter related configuration information for a plurality of signals may be transmitted through higher layer signaling (e.g., RRC signaling).

The terminal receives a transmission parameter update message for a specific downlink signal from the base station (S2402).

Here, the transmission parameter update message may include information for updating/changing transmission parameters for a specific downlink signal. In other words, the transmission parameter update message may include information for updating/changing a Rx beam for a specific downlink signal.

Specifically, the transmission parameter update message may include information for updating/changing a TCI state identifier for a specific downlink signal.

Alternatively, the transmission parameter update message may include, particularly, information for updating/changing the reference RS resource of QCL Type-D within the TCI state.

Here, the transmission parameter update message may be transmitted based on the MCE CE format for updating the TCI state and/or the MAC CE format for updating spatial relation info according to FIGS. 16 to 22.

Alternatively, the transmission parameter update message may be transmitted based on a newly defined MAC CE format for updating the TCI state (The corresponding MAC CE includes at least one of a target serving cell ID, a target BWP ID, a target group ID, a target list ID (or target RS/channel ID), and/or source (reference) RS ID).

The terminal receives a specific downlink signal from the base station based on updated transmission parameters (S2403).

Here, in addition to a specific downlink signal, transmission parameters for one or more signals among a plurality of signals (i.e., downlink signals and/or uplink signals) may also be identically updated by the transmission parameter update message. That is, when the transmission parameter of a specific downlink signal is updated from the first transmission parameter to the second transmission parameter, one or more signals for which the first transmission parameter has been configured may also be unitedly updated with the second transmission parameter.

Specifically, as described above, transmission parameters for the one or more signals may be updated based on at least one of option 1 to option 3 of the Embodiment 1.

According to option 1, for example, based on the update target being a specific downlink signal, when the TCI state of a specific downlink signal is updated from the first TCI state identifier to the second TCI state identifier, a TCI state of one or more downlink signals for which the first TCI state identifier identical to those of the specific downlink signal has been set may also be identically updated to the second TCI state identifier. As another example, when the reference RS of a specific downlink signal is updated from the first RS to the second RS, the reference RS of one or more downlink signals that referred to the first RS may also be updated to refer to the second RS.

In addition, according to option 3, for example, regardless of the update target being a specific downlink signal or a specific uplink signal, when the TCI state of a specific signal is updated from the first TCI state identifier to the second TCI state identifier by the update message, a TCI state of one or more downlink signals and uplink signals for which the first TCI state identifier identical to those of the specific signal has been set may also be identically updated to the second TCI state identifier. As another example, when the reference RS of a specific signal is updated from the first RS to the second RS, the reference RS of one or more downlink signals and uplink signals that referred to the first RS may also be updated to refer to the second RS.

Alternatively, according to the above embodiment a, the update may be performed based on a group (or list) including a plurality of signals. In other words, transmission parameters for one or more signals in a group to which a specific downlink signal belongs among the plurality of signals may be identically updated by the update message. That is, when the TCI state of a specific signal is updated from the first TCI state identifier to the second TCI state identifier by the update message, a TCI state of one or more downlink signals and uplink signals belonging to the same group (or list) to which the specific signal belongs may also be identically updated to the second TCI state identifier. As another example, when the reference RS of a specific signal is updated from the first RS to the second RS, the reference RS of one or more downlink signals and uplink signals belonging to the same group (or list) to which the specific signal belongs may also be updated to refer to the second RS.

Alternatively, according to the embodiment b, the update may be performed according to at least one of option 1 to option 3 of the embodiment 1 based on a group (or list) including a plurality of signals. In other words, transmission parameters of one or more signals, for which a transmission parameter identical to those of the specific downlink signal is configured, among signals within a group to which the specific downlink signal belongs, among the plurality of signals, may be identically updated by the update message. Except for the limitation on signals in a group to which a specific downlink signal belongs, the methods described in options 1 to 3 described above may be applied in the same manner.

Additionally, transmission parameters for a plurality of signals may be associated with panel identifiers. In this case, updating the transmission parameter for the specific signal may include updating the panel identifier, and the panel identifier of one or more downlink signals and/or uplink signals may also be updated in the same manner.

In addition, the update of the transmission parameter for the specific signal may be related to a plurality of CCs/BWPs (e.g., a set of CCs/BWPs). That is, an update for a plurality of CCs and/or a plurality of BWPs may be simultaneously applied by the transmission parameter update message. Here, the frequency domain (i.e., CC/BWP) in which the one or more signals are configured may be i) the same frequency domain as the frequency domain (i.e., CC/BWP) in which the specific downlink signal is configured, or ii) may include the different frequency domain as the frequency domain (i.e., CC/BWP) in which the specific downlink signal is configured.

Figure 25:
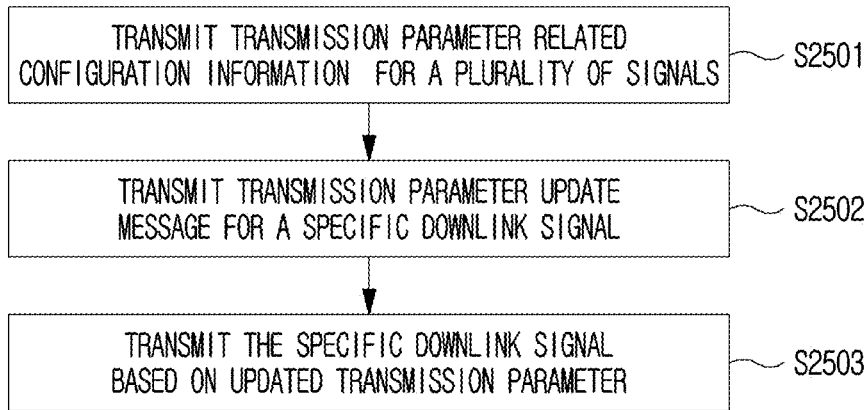
FIG. 25 is a diagram illustrating an operation of a base station for transmitting and receiving a downlink signal according to an embodiment of the present disclosure.

FIG. 25 is a diagram illustrating an operation of a base station for transmitting and receiving a downlink signal according to an embodiment of the present disclosure.

In FIG. 25, an operation of a terminal based on the operation and detailed embodiments (options 1, 2, and 3, other examples of embodiment 1 and embodiment a), embodiment b), and Alts 1 and 2) of the previously proposed embodiment 1 is exemplified. The example of FIG. 25 is for convenience of description, and does not limit the scope of the present disclosure. Some step(s) illustrated in FIG. 25 may be omitted depending on circumstances and/or configuration. In addition, the base station in FIG. 25 is only one example, and may be implemented as the apparatus illustrated in FIG. 28 below. For example, the processor 102/202 of FIG. 28 may control to transmit and receive channel/signal/data/information (e.g., RRC signaling, MAC CE, DCI for UL/DL scheduling, SRS, PDCCH, PDSCH, PUSCH, PUCCH, etc.) using the transceiver 106/206, and may control to store channel/signal/data/information to be transmitted or received in the memory 104/204.

Also, the operation of FIG. 25 may be processed by one or more processors (102, 202) in FIG. 28, and the operation of FIG. 25 may be stored in a memory (e.g., one or more memories (104, 204) in FIG. 28, in the form of instructions/programs (e.g., instructions, executable code) for driving at least one processor (102, 202) in FIG. 28.

Referring to FIG. 25, a base station transmits transmission parameter-related configuration information for a plurality of signals to a terminal (S2501).

Here, the plurality of signals may mean a plurality of downlink signals (e.g., PDSCH (or DMRS of PDSCH), PDCCH (or DMRS of PDCCH), CSI-RS, etc.), or a plurality of uplink signals (e.g., PUSCH (or DMRS of PUSCH), PUCCH (or DMRS of PUCCH), SRS, etc.), or may mean a plurality of downlink and uplink signals.

In addition, as described above, transmission parameters for a plurality of signals may mean configuration information related to a Rx beam of a terminal for downlink signals and/or a Tx beam of a terminal for uplink signals.

Specifically, as described above, the transmission parameter for a plurality of signals may mean a TCI state (e.g., QCL type for source (reference) RS, source (reference) RS resource) for each of the plurality of signals. In this case, each of the TCI states may be identified by a TCI state identifier.

Alternatively, transmission parameters for a plurality of signals may mean a reference RS of QCL type-D, particularly within a TCI state. In this case, QCL type D reference RSs may be identified by QCL type D reference RS resources.

Alternatively, transmission parameters for a plurality of signals may mean spatial relation information (e.g., spatial domain Tx filter/coefficient) for each of a plurality of signals, particularly for uplink signals. In this case, each of spatial relation information may be identified by a spatial relation info identifier. In this case, the TCI state identifier for downlink signals and the spatial relation info identifier for uplink signals may have the same meaning (same form).

In addition, configuration information related to transmission parameters for a plurality of signals may include a panel identifier associated with transmission parameters for the plurality of signals. That is, transmission parameters for a plurality of signals may be associated with panel identifiers. In this case, updating transmission parameters may include updating panel identifiers.

In addition, transmission parameter related configuration information for a plurality of signals may include group information (or list information) for the plurality of signals (e.g., Identifier information of a group (or list) to which each of a plurality of signals belongs). The group (or list) of the plurality of signals may be restricted to be grouped only with specific signals. For example, when grouping the plurality of signals, a specific group (or list) may consist of only uplink signals or only downlink signals. Alternatively, a specific group (or list) may consist of only reference signals or only channels.

In addition, through transmission parameter related configuration information for a plurality of signals or separate higher layer signaling, whether transmission parameters for one or more signals including the specific downlink signal are all identically updated by the transmission parameter update message may be configured.

Transmission parameter related configuration information for a plurality of signals may be transmitted through higher layer signaling (e.g., RRC signaling).

The base station transmits a transmission parameter update message for a specific downlink signal to the terminal (S2502).

Here, the transmission parameter update message may include information for updating/changing transmission parameters for a specific downlink signal. In other words, the transmission parameter update message may include information for updating/changing a Rx beam for a specific downlink signal.

Specifically, the transmission parameter update message may include information for updating/changing a TCI state identifier for a specific downlink signal.

Alternatively, the transmission parameter update message may include, particularly, information for updating/changing the reference RS resource of QCL Type-D within the TCI state.

Here, the transmission parameter update message may be transmitted based on the MCE CE format for updating the TCI state and/or the MAC CE format for updating spatial relation info according to FIGS. 16 to 22.

Alternatively, the transmission parameter update message may be transmitted based on a newly defined MAC CE format for updating the TCI state (The corresponding MAC CE includes at least one of a target serving cell ID, a target BWP ID, a target group ID, a target list ID (or target RS/channel ID), and/or source (reference) RS ID).

The base station transmits a specific downlink signal to the terminal based on updated transmission parameters (S2503).

Here, in addition to a specific downlink signal, transmission parameters for one or more signals among a plurality of signals (i.e., downlink signals and/or uplink signals) may also be identically updated by the transmission parameter update message. That is, when the transmission parameter of a specific downlink signal is updated from the first transmission parameter to the second transmission parameter, one or more signals for which the first transmission parameter has been configured may also be unitedly updated with the second transmission parameter.

Specifically, as described above, transmission parameters for the one or more signals may be updated based on at least one of option 1 to option 3 of the Embodiment 1.

According to option 1, for example, based on the update target being a specific downlink signal, when the TCI state of a specific downlink signal is updated from the first TCI state identifier to the second TCI state identifier, a TCI state of one or more downlink signals for which the first TCI state identifier identical to those of the specific downlink signal has been set may also be identically updated to the second TCI state identifier. As another example, when the reference RS of a specific downlink signal is updated from the first RS to the second RS, the reference RS of one or more downlink signals that referred to the first RS may also be updated to refer to the second RS.

In addition, according to option 3, for example, regardless of the update target being a specific downlink signal or a specific uplink signal, when the TCI state of a specific signal is updated from the first TCI state identifier to the second TCI state identifier by the update message, a TCI state of one or more downlink signals and uplink signals for which the first TCI state identifier identical to those of the specific signal has been set may also be identically updated to the second TCI state identifier. As another example, when the reference RS of a specific signal is updated from the first RS to the second RS, the reference RS of one or more downlink signals and uplink signals that referred to the first RS may also be updated to refer to the second RS.

Alternatively, according to the above embodiment a, the update may be performed based on a group (or list) including a plurality of signals. In other words, transmission parameters for one or more signals in a group to which a specific downlink signal belongs among the plurality of signals may be identically updated by the update message. That is, when the TCI state of a specific signal is updated from the first TCI state identifier to the second TCI state identifier by the update message, a TCI state of one or more downlink signals and uplink signals belonging to the same group (or list) to which the specific signal belongs may also be identically updated to the second TCI state identifier. As another example, when the reference RS of a specific signal is updated from the first RS to the second RS, the reference RS of one or more downlink signals and uplink signals belonging to the same group (or list) to which the specific signal belongs may also be updated to refer to the second RS.

Alternatively, according to the embodiment b, the update may be performed according to at least one of option 1 to option 3 of the embodiment 1 based on a group (or list) including a plurality of signals. In other words, transmission parameters of one or more signals, for which a transmission parameter identical to those of the specific downlink signal is configured, among signals within a group to which the specific downlink signal belongs, among the plurality of signals, may be identically updated by the update message. Except for the limitation on signals in a group to which a specific downlink signal belongs, the methods described in options 1 to 3 described above may be applied in the same manner.

Additionally, transmission parameters for a plurality of signals may be associated with panel identifiers. In this case, updating the transmission parameter for the specific signal may include updating the panel identifier, and the panel identifier of one or more downlink signals and/or uplink signals may also be updated in the same manner.

In addition, the update of the transmission parameter for the specific signal may be related to a plurality of CCs/BWPs (e.g., a set of CCs/BWPs). That is, an update for a plurality of CCs and/or a plurality of BWPs may be simultaneously applied by the transmission parameter update message. Here, the frequency domain (i.e., CC/BWP) in which the one or more signals are configured may be i) the same frequency domain as the frequency domain (i.e., CC/BWP) in which the specific downlink signal is configured, or ii) may include the different frequency domain as the frequency domain (i.e., CC/BWP) in which the specific downlink signal is configured.

Figure 26:
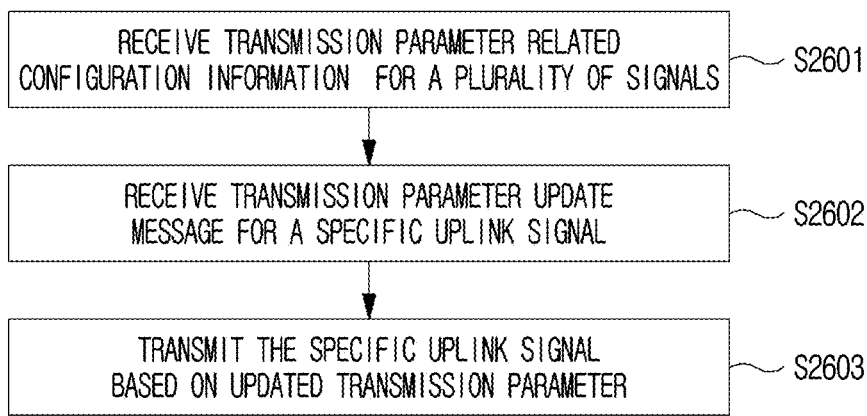
FIG. 26 is a diagram illustrating an operation of a terminal for transmitting and receiving an uplink signal according to an embodiment of the present disclosure.

FIG. 26 is a diagram illustrating an operation of a terminal for transmitting and receiving a uplink signal according to an embodiment of the present disclosure.

In FIG. 26, an operation of a terminal based on the operation and detailed embodiments (options 1, 2, and 3, other examples of embodiment 1 and embodiment a), embodiment b), and Alts 1 and 2) of the previously proposed embodiment 1 is exemplified. The example of FIG. 26 is for convenience of description, and does not limit the scope of the present disclosure. Some step(s) illustrated in FIG. 26 may be omitted depending on circumstances and/or configuration. In addition, the terminal in FIG. 26 is only one example, and may be implemented as the apparatus illustrated in FIG. 28 below. For example, the processor 102/202 of FIG. 28 may control to transmit and receive channel/signal/data/information (e.g., RRC signaling, MAC CE, DCI for UL/DL scheduling, SRS, PDCCH, PDSCH, PUSCH, PUCCH, etc.) using the transceiver 106/206, and may control to store channel/signal/data/information to be transmitted or received in the memory 104/204.

Also, the operation of FIG. 26 may be processed by one or more processors (102, 202) in FIG. 28, and the operation of FIG. 26 may be stored in a memory (e.g., one or more memories (104, 204) in FIG. 28, in the form of instructions/programs (e.g., instructions, executable code) for driving at least one processor (102, 202) in FIG. 28.

Referring to FIG. 26, a terminal receives transmission parameter-related configuration information for a plurality of signals from a base station (S2601).

Here, the plurality of signals may mean a plurality of downlink signals (e.g., PDSCH (or DMRS of PDSCH), PDCCH (or DMRS of PDCCH), CSI-RS, etc.), or a plurality of uplink signals (e.g., PUSCH (or DMRS of PUSCH), PUCCH (or DMRS of PUCCH), SRS, etc.), or may mean a plurality of downlink and uplink signals.

In addition, as described above, transmission parameters for a plurality of signals may mean configuration information related to a Rx beam of a terminal for downlink signals and/or a Tx beam of a terminal for uplink signals.

Specifically, as described above, the transmission parameter for a plurality of signals may mean a TCI state (e.g., QCL type for source (reference)) RS, source (reference) RS resource) for each of the plurality of signals. In this case, each of the TCI states may be identified by a TCI state identifier.

Alternatively, transmission parameters for a plurality of signals may mean a reference RS of QCL type-D, particularly within a TCI state. In this case, QCL type D reference RSs may be identified by QCL type D reference RS resources.

Alternatively, transmission parameters for a plurality of signals may mean spatial relation information (e.g., spatial domain Tx filter/coefficient) for each of a plurality of signals, particularly for uplink signals. In this case, each of spatial relation information may be identified by a spatial relation info identifier. In this case, the TCI state identifier for downlink signals and the spatial relation info identifier for uplink signals may have the same meaning (same form).

In addition, configuration information related to transmission parameters for a plurality of signals may include a panel identifier associated with transmission parameters for the plurality of signals. That is, transmission parameters for a plurality of signals may be associated with panel identifiers. In this case, updating transmission parameters may include updating panel identifiers.

In addition, transmission parameter related configuration information for a plurality of signals may include group information (or list information) for the plurality of signals (e.g., Identifier information of a group (or list) to which each of a plurality of signals belongs). The group (or list) of the plurality of signals may be restricted to be grouped only with specific signals. For example, when grouping the plurality of signals, a specific group (or list) may consist of only uplink signals or only downlink signals. Alternatively, a specific group (or list) may consist of only reference signals or only channels.

In addition, through transmission parameter related configuration information for a plurality of signals or separate higher layer signaling, whether transmission parameters for one or more signals including the specific downlink signal are all identically updated by the transmission parameter update message may be configured.

Transmission parameter related configuration information for a plurality of signals may be transmitted through higher layer signaling (e.g., RRC signaling).

The terminal receives a transmission parameter update message for a specific uplink signal from the base station (S2602).

Here, the transmission parameter update message may include information for updating/changing transmission parameters for a specific uplink signal. In other words, the transmission parameter update message may include information for updating/changing a Rx beam for a specific uplink signal.

Specifically, the transmission parameter update message may include information for updating/changing a TCI state identifier for a specific uplink signal.

Alternatively, the transmission parameter update message may include, particularly, information for updating/changing the reference RS resource of QCL Type-D within the TCI state.

Alternatively, the transmission parameter update message may include information for updating/changing the spatial relation info identifier.

Here, the transmission parameter update message may be transmitted based on the MCE CE format for updating the TCI state and/or the MAC CE format for updating spatial relation info according to FIGS. 16 to 22.

Alternatively, the transmission parameter update message may be transmitted based on a newly defined MAC CE format for updating the TCI state (The corresponding MAC CE includes at least one of a target serving cell ID, a target BWP ID, a target group ID, a target list ID (or target RS/channel ID), and/or source (reference) RS ID).

The terminal transmits a specific uplink signal to the base station based on updated transmission parameters (S2603).

Here, in addition to a specific uplink signal, transmission parameters for one or more signals among a plurality of signals (i.e., downlink signals and/or uplink signals) may also be identically updated by the transmission parameter update message. That is, when the transmission parameter of a specific uplink signal is updated from the first transmission parameter to the second transmission parameter, one or more signals for which the first transmission parameter has been configured may also be unitedly updated with the second transmission parameter.

Specifically, as described above, transmission parameters for the one or more signals may be updated based on at least one of option 1 to option 3 of the Embodiment 1.

In addition, according to option 2, for example, based on the update target being a specific uplink signal, when the TCI state of a specific uplink signal is updated from the first TCI state identifier to the second TCI state identifier, a TCI state of one or more uplink signals for which the first TCI state identifier identical to those of the specific uplink signal has been set may also be identically updated to the second TCI state identifier. For another example, when spatial relation info of a specific uplink signal is updated from the first spatial relation info identifier to the second spatial relation info identifier, spatial relation info of one or more uplink signals for which the first spatial relation info identifier identical to those of the specific uplink signal has been set may also be identically updated to the second spatial relation info identifier. As another example, when the reference RS of a specific uplink signal is updated from the first RS to the second RS, the reference RS of one or more uplink signals that referred to the first RS may also be updated to refer to the second RS.

In addition, according to option 3, for example, regardless of the update target being a specific downlink signal or a specific uplink signal, when the TCI state of a specific signal is updated from the first TCI state identifier to the second TCI state identifier by the update message, a TCI state of one or more downlink signals and uplink signals for which the first TCI state identifier identical to those of the specific signal has been set may also be identically updated to the second TCI state identifier. As another example, when the reference RS of a specific signal is updated from the first RS to the second RS, the reference RS of one or more downlink signals and uplink signals that referred to the first RS may also be updated to refer to the second RS.

Alternatively, according to the above embodiment a, the update may be performed based on a group (or list) including a plurality of signals. In other words, transmission parameters for one or more signals in a group to which a specific uplink signal belongs among the plurality of signals may be identically updated by the update message. That is, when the TCI state of a specific signal is updated from the first TCI state identifier to the second TCI state identifier by the update message, a TCI state of one or more downlink signals and uplink signals belonging to the same group (or list) to which the specific signal belongs may also be identically updated to the second TCI state identifier. As another example, when the reference RS of a specific signal is updated from the first RS to the second RS, the reference RS of one or more downlink signals and uplink signals belonging to the same group (or list) to which the specific signal belongs may also be updated to refer to the second RS.

Alternatively, according to the embodiment b, the update may be performed according to at least one of option 1 to option 3 of the embodiment 1 based on a group (or list) including a plurality of signals. In other words, transmission parameters of one or more signals, for which a transmission parameter identical to those of the specific uplink signal is configured, among signals within a group to which the specific uplink signal belongs, among the plurality of signals, may be identically updated by the update message. Except for the limitation on signals in a group to which a specific uplink signal belongs, the methods described in options 1 to 3 described above may be applied in the same manner.

Additionally, transmission parameters for a plurality of signals may be associated with panel identifiers. In this case, updating the transmission parameter for the specific signal may include updating the panel identifier, and the panel identifier of one or more downlink signals and/or uplink signals may also be updated in the same manner.

In addition, the update of the transmission parameter for the specific signal may be related to a plurality of CCs/BWPs (e.g., a set of CCs/BWPs). That is, an update for a plurality of CCs and/or a plurality of BWPs may be simultaneously applied by the transmission parameter update message. Here, the frequency domain (i.e., CC/BWP) in which the one or more signals are configured may be i) the same frequency domain as the frequency domain (i.e., CC/BWP) in which the specific uplink signal is configured, or ii) may include the different frequency domain as the frequency domain (i.e., CC/BWP) in which the specific uplink signal is configured.

Figure 27:
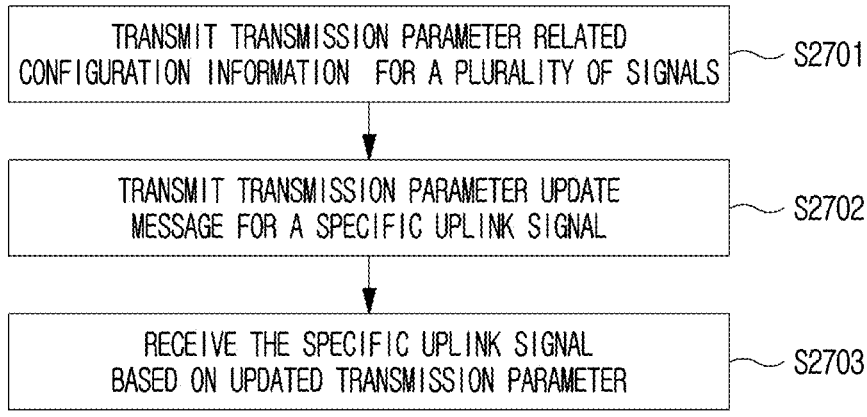
FIG. 27 is a diagram illustrating an operation of a base station for transmitting and receiving an uplink signal according to an embodiment of the present disclosure.

FIG. 27 is a diagram illustrating an operation of a base station for transmitting and receiving a uplink signal according to an embodiment of the present disclosure.

In FIG. 27, an operation of a terminal based on the operation and detailed embodiments (options 1, 2, and 3, other examples of embodiment 1 and embodiment a), embodiment b), and Alts 1 and 2) of the previously proposed embodiment 1 is exemplified. The example of FIG. 27 is for convenience of description, and does not limit the scope of the present disclosure. Some step(s) illustrated in FIG. 27 may be omitted depending on circumstances and/or configuration. In addition, the base station in FIG. 27 is only one example, and may be implemented as the apparatus illustrated in FIG. 28 below. For example, the processor 102/202 of FIG. 28 may control to transmit and receive channel/signal/data/information (e.g., RRC signaling, MAC CE, DCI for UL/DL scheduling, SRS, PDCCH, PDSCH, PUSCH, PUCCH, etc.) using the transceiver 106/206, and may control to store channel/signal/data/information to be transmitted or received in the memory 104/204.

Also, the operation of FIG. 27 may be processed by one or more processors (102, 202) in FIG. 28, and the operation of FIG. 27 may be stored in a memory (e.g., one or more memories (104, 204) in FIG. 28, in the form of instructions/programs (e.g., instructions, executable code) for driving at least one processor (102, 202) in FIG. 28.

Referring to FIG. 27, a base station transmits transmission parameter-related configuration information for a plurality of signals to a terminal (S2701).

Here, the plurality of signals may mean a plurality of downlink signals (e.g., PDSCH (or DMRS of PDSCH), PDCCH (or DMRS of PDCCH), CSI-RS, etc.), or a plurality of uplink signals (e.g., PUSCH (or DMRS of PUSCH), PUCCH (or DMRS of PUCCH), SRS, etc.), or may mean a plurality of downlink and uplink signals.

In addition, as described above, transmission parameters for a plurality of signals may mean configuration information related to a Rx beam of a terminal for downlink signals and/or a Tx beam of a terminal for uplink signals.

Specifically, as described above, the transmission parameter for a plurality of signals may mean a TCI state (e.g., QCL type for source (reference) RS, source (reference) RS resource) for each of the plurality of signals. In this case, each of the TCI states may be identified by a TCI state identifier.

Alternatively, transmission parameters for a plurality of signals may mean a reference RS of QCL type-D, particularly within a TCI state. In this case, QCL type D reference RSs may be identified by QCL type D reference RS resources.

Alternatively, transmission parameters for a plurality of signals may mean spatial relation information (e.g., spatial domain Tx filter/coefficient) for each of a plurality of signals, particularly for uplink signals. In this case, each of spatial relation information may be identified by a spatial relation info identifier. In this case, the TCI state identifier for downlink signals and the spatial relation info identifier for uplink signals may have the same meaning (same form).

In addition, configuration information related to transmission parameters for a plurality of signals may include a panel identifier associated with transmission parameters for the plurality of signals. That is, transmission parameters for a plurality of signals may be associated with panel identifiers. In this case, updating transmission parameters may include updating panel identifiers.

In addition, transmission parameter related configuration information for a plurality of signals may include group information (or list information) for the plurality of signals (e.g., Identifier information of a group (or list) to which each of a plurality of signals belongs). The group (or list) of the plurality of signals may be restricted to be grouped only with specific signals. For example, when grouping the plurality of signals, a specific group (or list) may consist of only uplink signals or only downlink signals. Alternatively, a specific group (or list) may consist of only reference signals or only channels.

In addition, through transmission parameter related configuration information for a plurality of signals or separate higher layer signaling, whether transmission parameters for one or more signals including the specific downlink signal are all identically updated by the transmission parameter update message may be configured.

Transmission parameter related configuration information for a plurality of signals may be transmitted through higher layer signaling (e.g., RRC signaling).

The base station transmits a transmission parameter update message for a specific uplink signal to the terminal (S2702).

Here, the transmission parameter update message may include information for updating/changing transmission parameters for a specific uplink signal. In other words, the transmission parameter update message may include information for updating/changing a Rx beam for a specific uplink signal.

Specifically, the transmission parameter update message may include information for updating/changing a TCI state identifier for a specific uplink signal.

Alternatively, the transmission parameter update message may include, particularly, information for updating/changing the reference RS resource of QCL Type-D within the TCI state.

Alternatively, the transmission parameter update message may include information for updating/changing the spatial relation info identifier.

Here, the transmission parameter update message may be transmitted based on the MCE CE format for updating the TCI state and/or the MAC CE format for updating spatial relation info according to FIGS. 16 to 22.

Alternatively, the transmission parameter update message may be transmitted based on a newly defined MAC CE format for updating the TCI state (The corresponding MAC CE includes at least one of a target serving cell ID, a target BWP ID, a target group ID, a target list ID (or target RS/channel ID), and/or source (reference) RS ID).

The base station receives a specific uplink signal from the terminal based on updated transmission parameters (S2703).

Here, in addition to a specific uplink signal, transmission parameters for one or more signals among a plurality of signals (i.e., downlink signals and/or uplink signals) may also be identically updated by the transmission parameter update message. That is, when the transmission parameter of a specific uplink signal is updated from the first transmission parameter to the second transmission parameter, one or more signals for which the first transmission parameter has been configured may also be unitedly updated with the second transmission parameter.

Specifically, as described above, transmission parameters for the one or more signals may be updated based on at least one of option 1 to option 3 of the Embodiment 1.

In addition, according to option 2, for example, based on the update target being a specific uplink signal, when the TCI state of a specific uplink signal is updated from the first TCI state identifier to the second TCI state identifier, a TCI state of one or more uplink signals for which the first TCI state identifier identical to those of the specific uplink signal has been set may also be identically updated to the second TCI state identifier. For another example, when spatial relation info of a specific uplink signal is updated from the first spatial relation info identifier to the second spatial relation info identifier, spatial relation info of one or more uplink signals for which the first spatial relation info identifier identical to those of the specific uplink signal has been set may also be identically updated to the second spatial relation info identifier. As another example, when the reference RS of a specific uplink signal is updated from the first RS to the second RS, the reference RS of one or more uplink signals that referred to the first RS may also be updated to refer to the second RS.

In addition, according to option 3, for example, regardless of the update target being a specific downlink signal or a specific uplink signal, when the TCI state of a specific signal is updated from the first TCI state identifier to the second TCI state identifier by the update message, a TCI state of one or more downlink signals and uplink signals for which the first TCI state identifier identical to those of the specific signal has been set may also be identically updated to the second TCI state identifier. As another example, when the reference RS of a specific signal is updated from the first RS to the second RS, the reference RS of one or more downlink signals and uplink signals that referred to the first RS may also be updated to refer to the second RS.

Alternatively, according to the above embodiment a, the update may be performed based on a group (or list) including a plurality of signals. In other words, transmission parameters for one or more signals in a group to which a specific uplink signal belongs among the plurality of signals may be identically updated by the update message. That is, when the TCI state of a specific signal is updated from the first TCI state identifier to the second TCI state identifier by the update message, a TCI state of one or more downlink signals and uplink signals belonging to the same group (or list) to which the specific signal belongs may also be identically updated to the second TCI state identifier. As another example, when the reference RS of a specific signal is updated from the first RS to the second RS, the reference RS of one or more downlink signals and uplink signals belonging to the same group (or list) to which the specific signal belongs may also be updated to refer to the second RS.

Alternatively, according to the embodiment b, the update may be performed according to at least one of option 1 to option 3 of the embodiment 1 based on a group (or list) including a plurality of signals. In other words, transmission parameters of one or more signals, for which a transmission parameter identical to those of the specific uplink signal is configured, among signals within a group to which the specific uplink signal belongs, among the plurality of signals, may be identically updated by the update message. Except for the limitation on signals in a group to which a specific uplink signal belongs, the methods described in options 1 to 3 described above may be applied in the same manner.

Additionally, transmission parameters for a plurality of signals may be associated with panel identifiers. In this case, updating the transmission parameter for the specific signal may include updating the panel identifier, and the panel identifier of one or more downlink signals and/or uplink signals may also be updated in the same manner.

In addition, the update of the transmission parameter for the specific signal may be related to a plurality of CCs/BWPs (e.g., a set of CCs/BWPs). That is, an update for a plurality of CCs and/or a plurality of BWPs may be simultaneously applied by the transmission parameter update message. Here, the frequency domain (i.e., CC/BWP) in which the one or more signals are configured may be i) the same frequency domain as the frequency domain (i.e., CC/BWP) in which the specific uplink signal is configured, or ii) may include the different frequency domain as the frequency domain (i.e., CC/BWP) in which the specific uplink signal is configured.

General Device to which the Present Disclosure May be Applied

FIG. 28 illustrates a block diagram of a wireless communication device according to an embodiment of the present disclosure.

In reference to FIG. 28, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts disclosed in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device XXX, YYY of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device XXX, YYY of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:
receiving first information for configuring a plurality of spatial parameters for a plurality of signals;
receiving second information for indicating a spatial parameter for a downlink signal based on the first information; and
receiving the downlink signal based on the second information,
wherein, based on at least one signal of the plurality of signals being configured to refer to a reference signal related to a spatial parameter of the downlink signal prior to reception of the second information, a spatial parameter for the at least one signal is updated to be identical to the spatial parameter for the downlink signal.

2. The method of claim 1,
wherein the at least one signal comprises at least one downlink signal being configured with the same spatial parameter as the downlink signal, among the plurality of signals.

3. The method of claim 1,
wherein the at least one signal comprises at least one downlink signal and at least one uplink signal being configured with the same spatial parameter as the downlink signal, among the plurality of signals.

4. The method of claim 1,
wherein at least one group for the plurality of signals is configured by a higher layer signaling, and
wherein the downlink signal and the at least one signal belong to the same group.

5. The method of claim 1,
wherein spatial parameters for the plurality of signals are associated with a panel identifier, and
wherein an update for the spatial parameter includes an update of the panel identifier.

6. The method of claim 1,
wherein an update is simultaneously applied to a plurality of component carriers (CCs) and/or a plurality of bandwidth parts (BWPs) by the second information.

7. The method of claim 1,
wherein whether a spatial parameter for at least one signal is identically updated by the second information to be identical to the spatial parameter for the downlink signal is configured, through higher layer signaling.

8. The method of claim 1,
wherein the spatial parameter includes at least one of a transmission configuration indication (TCI) state or spatial relation info.

9. The method of claim 1,
wherein the signal includes at least one of a channel state information-reference signal (CSI-RS), a physical downlink control channel (PDCCH), a sounding reference signal (SRS), a physical uplink control channel (PUCCH), and/or a physical uplink shared channel (PUSCH).

10. An apparatus comprising:
at least one transceiver for transmitting and receiving a wireless signal; and
at least one processor for controlling the at least one transceiver,
wherein the at least one processor configured to:
receive first information for configuring a plurality of spatial parameters for a plurality of signals;
receive second information for indicating a spatial parameter for a downlink signal based on the first information; and
receive the downlink signal based on the second information,
wherein, based on at least one signal of the plurality of signals being configured to refer to a reference signal related to a spatial parameter of the downlink signal prior to reception of the second information, a spatial parameter for the at least one signal is updated to be identical to the spatial parameter for the downlink signal.

11. An apparatus comprising:
at least one transceiver for transmitting and receiving a wireless signal; and
at least one processor for controlling the at least one transceiver,
wherein the at least one processor configured to:
transmit first information for configuring a plurality of spatial parameters for a plurality of signals;
transmit second information for indicating a spatial parameter for a downlink signal based on the first information; and
transmit the downlink signal based on the second information,
wherein, based on at least one signal of the plurality of signals being configured to refer to a reference signal related to a spatial parameter of the downlink signal prior to reception of the second information, a spatial parameter for the at least one signal is updated to be identical to the spatial parameter for the downlink signal.

* * * * *